United States Patent [19]

Koga et al.

[11] Patent Number: 5,260,844
[45] Date of Patent: Nov. 9, 1993

[54] MODE CHANGING OVER MECHANISM FOR TAPE PLAYER

[75] Inventors: Noriyuki Koga; Takeyoshi Takashima, both of Chiba, Japan

[73] Assignee: Sony Corporation, Tokyo, Japan

[21] Appl. No.: 795,964

[22] Filed: Nov. 21, 1991

[30] Foreign Application Priority Data

Nov. 29, 1990 [JP] Japan .................. 2-332539

[51] Int. Cl.$^5$ ............................................. G11B 5/008
[52] U.S. Cl. ...................................... 360/96.3; 360/137
[58] Field of Search ................ 360/74.1, 74.2, 137, 360/96.1–96.5

[56] References Cited

U.S. PATENT DOCUMENTS 4,956,731 9/1990 Yoshimura ...................... 360/137

Primary Examiner—John H. Wolff
Assistant Examiner—David D. Davis
Attorney, Agent, or Firm—Lewis H. Eslinger; Jay H. Maioli

[57] ABSTRACT

A mode changing over mechanism for a tape player which can change over the mode of operation of the tape recorder with a simple structure and can be constructed in a small size and thickness at a low cost. The mechanism comprises a direction slider movable among normal and reverse mode positions and a stopping position, a trigger member having an engaging portion movable between arresting and non-arresting positions, and a rotatable cam gear having a cam section having normal and reverse mode pressing faces for pressing a control portion of the direction slider in the opposite directions. When the engaging portion is at the arresting position, the cam gear is inhibited from rotating at a position when a play mode or a stop mode is established. When the engaging portion is moved once to the non-arresting position in a stop mode, the normal mode pressing face presses the control portion to move the direction slider to the normal mode position, but when movement of the engaging portion to the nonarresting position is performed twice at a predetermined interval of time, the reverse mode pressing face presses the control portion to move the direction slider to the reverse mode position.

5 Claims, 28 Drawing Sheets

F I G. 15(A)
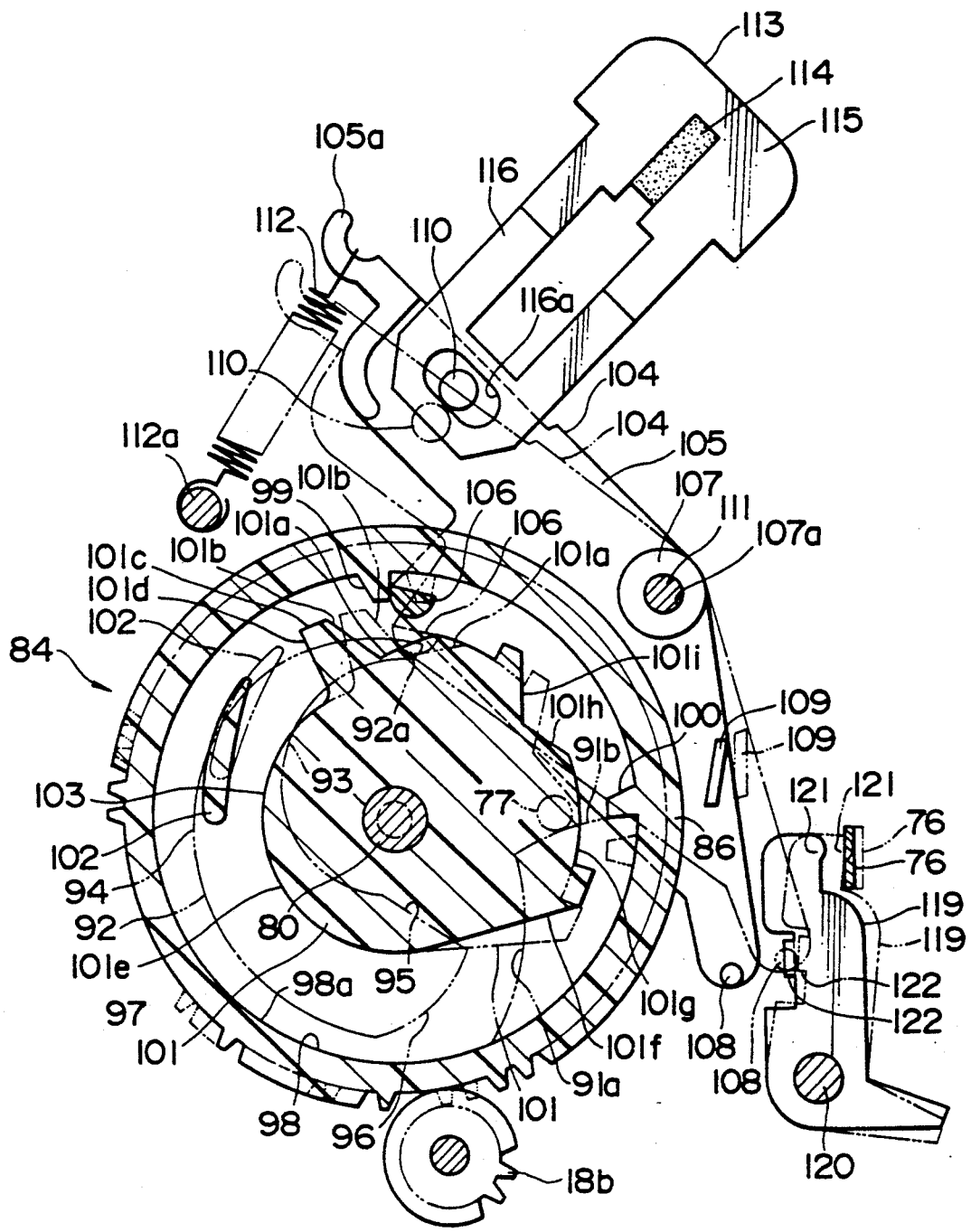

MODE CHANGING OVER MECHANISM FOR TAPE PLAYER

BACKGROUND OF THE INVENTION

1. Field of the invention

This invention relates to a novel mode changing over mechanism for a tape player, and more particularly to a mode changing over mechanism for a tape player with a so-called reverse mode.

2. Description of the Prior Art

Tape players are commonly constructed such that they can selectively establish a plurality of modes such as a play mode in which recording or reproduction onto or from a tape is performed, a stop mode in which the tape player is at rest and a high speed feeding mode in which fast feeding or rewinding of a tape is performed. Such selective establishment of any of those modes is performed by changing over the position of a tape feeding direction defining member such as an oscillating lever on which a pinch roller arm on which a pinch roller for being resiliently pressed against a capstan to feed a tape at a fixed speed is supported and an oscillating gear which is selectively engaged with one of a pair of reel bases to rotate the reel base in a tape winding direction are supported or by changing over the position of a magnetic head or the like.

The position of such tape feeding direction defining member or the like is changed over by a mode changing over mechanism. Such changing over mechanism is basically constructed so as to effect position control of various movable members such that, when a play mode is to be established, a pinch roller lever is moved to a position at which a pinch roller thereon is resiliently pressed against a capstan while a magnetic head is moved to a position at which it contacts with a tape and an oscillating lever is moved to a position at which an oscillating gear thereon engages one of a pair of reel bases, but when a stop mode is to be established, the pinch roller lever is returned to a home position at which the pinch roller thereon is spaced away from the capstan; the magnetic head is returned to a home position at which the magnetic head is spaced away from the tape; and the oscillating lever is returned to a home position at which the oscillating gear thereon is disengaged from the reel base.

It is to be noted that a high speed feeding mode is established normally by causing one of a pair of reel bases to selectively rotate, in a condition of a stop mode of the tape player, at a high speed in a tape winding direction.

By the way, most of tape players at present are provided with a so-called reverse mode, that is, constructed such that they have two play modes including a normal play mode in which recording or reproduction is performed while a tape is fed in one direction and a reverse play mode in which recording or reproduction is performed while a tape is fed in the opposite direction and one of the two play modes can be selectively established. Accordingly, a mode changing over mechanism for a tape player of the type mentioned must be constructed such that it can selectively take at least a first position in which a normal play mode is established, a second position in which a reverse play mode is established and a third position in which a stop mode is established.

A conventional mode changing over mechanism for a tape player with a reverse mode in some cases includes a mode changing over lever which is moved from and to three positions corresponding individually to the three positions described above, that is, a normal mode position in which a normal play mode is established, a reverse mode position in which a reverse play mode is established and a stop position in which a stop mode is established, and controlling means for controlling the position of the mode changing over lever. An exemplary one of such conventional controlling means includes a cam gear on which a cam element is provided for selectively pressing a control portion provided on the mode changing over lever in two opposite directions.

However, such conventional mode changing over mechanism of the type which includes a mode changing over lever and a cam gear as described above is complicated in construction such that means for selectively changing over a relationship between the cam element provided on the cam gear and the control portion provided on the mode changing over lever, that is, for changing over the relationship between a first relationship in which the cam element presses the control portion in one direction and a second relationship in which the cam element presses the control portion in the other direction, is composed of a large number of members. Accordingly, the conventional mode changing over mechanism is disadvantageous in that it makes the structure of the tape player complicated and besides miniaturization and reduction in thickness cannot be achieved and the production cost is high.

SUMMARY OF THE INVENTION

It is an object of the present invention to provide a mode changing over mechanism for a tape player which can change over the mode of operation of the tape recorder with a simple structure and can be constructed in a small size and thickness at a low cost.

In order to attain the object, according to the present invention, there is provided a mode changing over mechanism for a tape player, which comprises a direction slider movable from and to a normal mode position in which a normal play mode of the tape player in which recording or reproduction is performed while a tape is fed in one direction is established, a reverse mode position in which a reverse play mode of the tape player in which recording or reproduction is performed while a tape is fed in a direction opposite to the one direction is established, and a stopping position in which a stop mode of the tape player in which the tape player is inoperative is established, the direction slider having a control portion thereon, a trigger member having an engaging portion movable between an arresting position and a non-arresting position, and a rotatable cam gear having a first cam section which includes a normal mode pressing face for pressing the control portion of the direction slider in one direction and a reverse mode pressing face for pressing the control portion in another direction, the cam gear further having a second cam section associated with the engaging portion, the cam gear being inhibited from rotating, when the engaging portion of the trigger member is at the arresting position, at a position thereof when a play mode is established and another position thereof when a stop mode is established, and wherein the normal mode pressing face of the first cam section of the cam gear presses, when the engaging portion of the trigger member is moved once to the nonarresting position while the tape player is in a stop mode, the control portion of the direction slider to move the direction slider to the normal mode position, but when movement of the engaging portion of the trigger member to the non-arresting position is performed twice at a predetermined interval of time, the reverse mode pressing face of the first cam section presses the control portion to move the direction slider to the reverse mode position.

With the mode changing over mechanism for a tape player, the trigger member for selectively inhibiting rotation of the cam gear at a predetermined position has another function of selectively changing over the relationship between the first cam section of the cam gear for pressing the direction slider and the control portion of the direction slider between two relationships including a relationship in which a condition wherein the first cam section presses the control portion in one direction is provided and another relationship in which another condition wherein the first cam portion presses the control portion in the other direction is provided. Besides, such selective changing over between the two relationships is performed only by differentiating the number of times by which the trigger member is moved to the non-arresting position. Accordingly, special means for selectively changing over the direction in which the cam gear presses the direction slider is quite unnecessary and the structure of a mechanism of the type can be made very simple.

Preferably, when movement of the engaging portion of the trigger member to the non-arresting position is performed twice at the predetermined interval of time, the engaging portion of the trigger member is pressed by the second cam section so that the trigger member presses the direction slider in the other direction thereby to cause the reverse mode pressing face of the first cam section to press the control portion in order to move the direction slider to the reverse mode position.

The cam gear may have a first locked position for a stop mode and a second locked position for a normal or reverse play mode and be moved from the first to the second locked position or from the second to the first locked position by the trigger member.

Preferably, the trigger member includes electromagnetic means.

Preferably, the cam gear has a non-toothed portion and is moved to a position at which the nontoothed portion thereof is opposed to a driving gear by operation of the trigger member.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 15(A) and 15(B) are enlarged horizontal sectional views showing the mode changing over mechanism at different positions upon initial triggering;

DESCRIPTION OF THE PREFERRED EMBODIMENT

Figure 1:
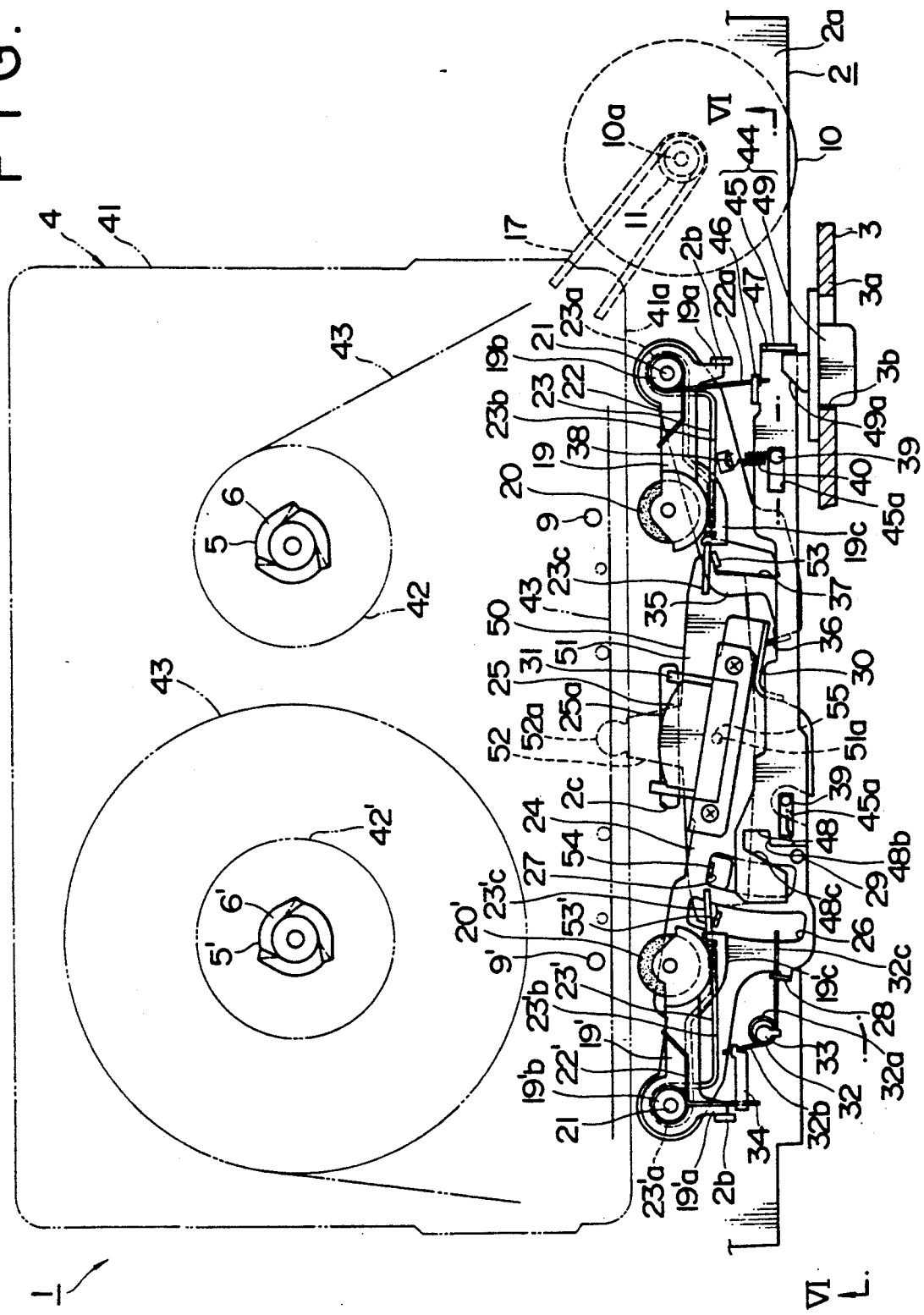
FIG. 1 is a plan view, partly broken, of part of a mode changing over mechanism for a tape player above a mechanism chassis showing a preferred embodiment of the present invention.
Figure 2:
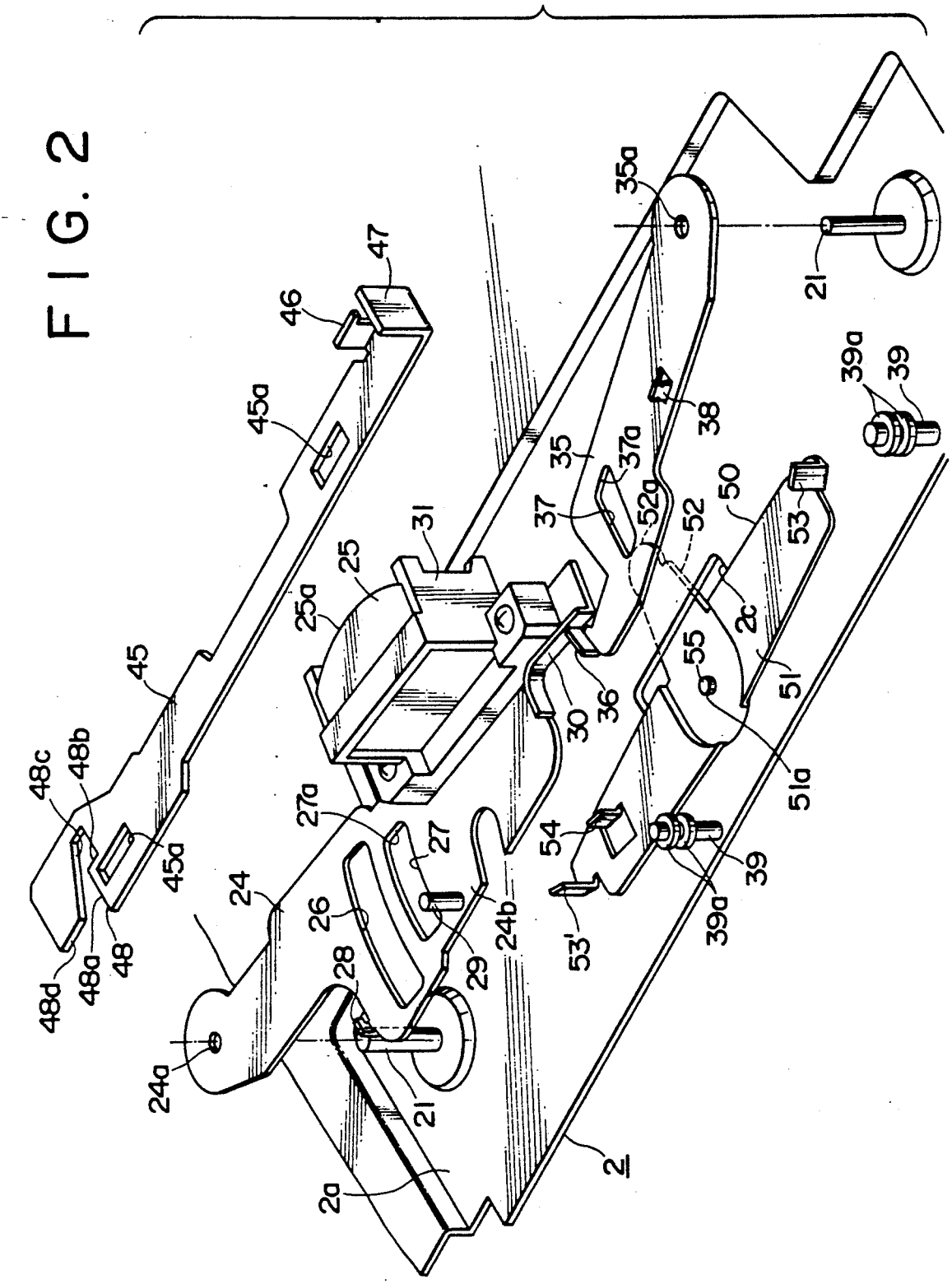
FIG. 2 is an enlarged exploded perspective view showing various elements of the mode changing over mechanism above the mechanism chassis.
Figure 3:
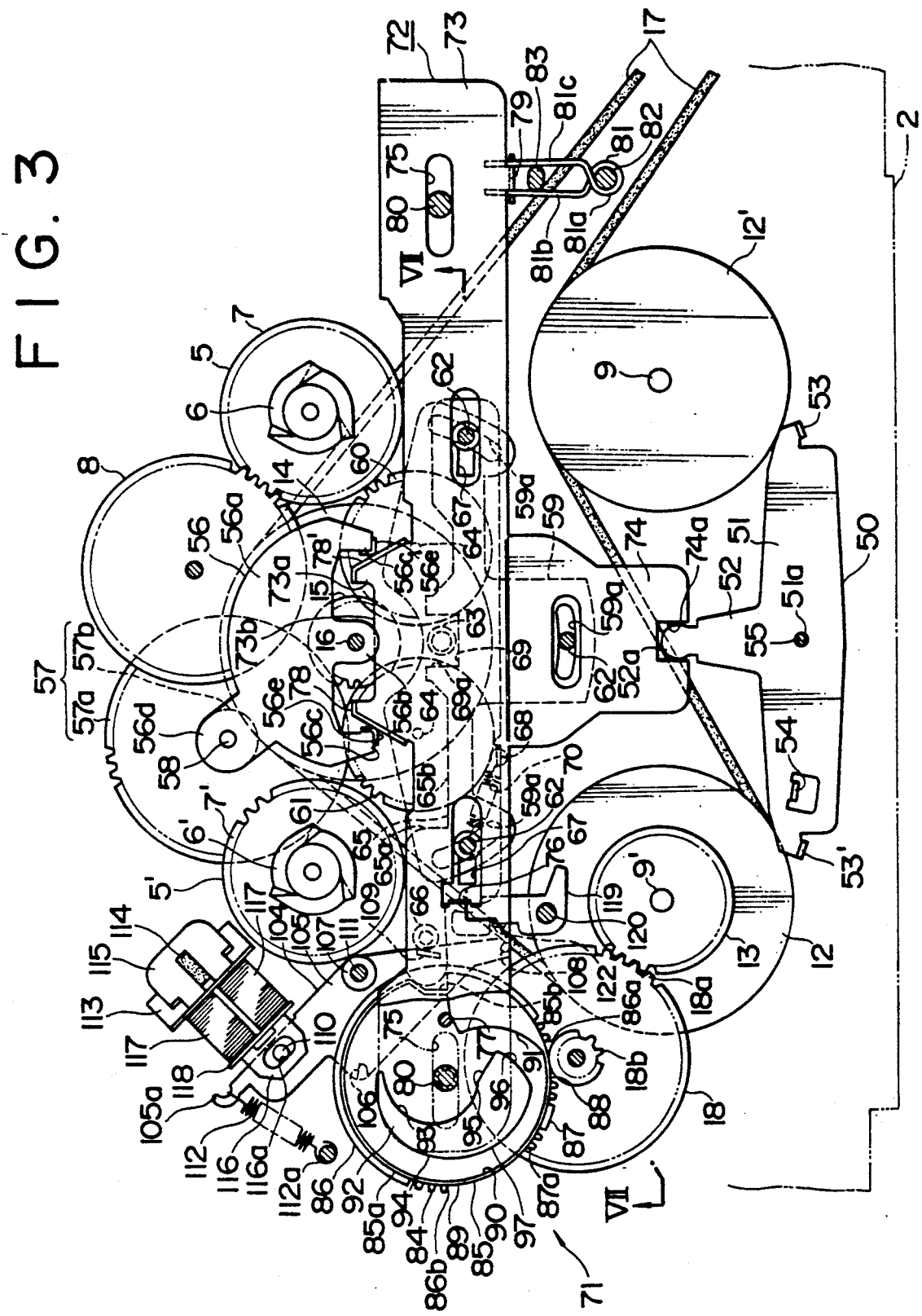
FIG. 3 is an enlarged plan view of different part of the mode changing over mechanism below the mechanism chassis.

Referring first to FIGS. 1, 3. 4, 6 to 11 and 15 to 21, there is shown a mode changing over mechanism for a tape player to which the present invention is applied. The mode changing over mechanism is incorporated in a tape player generally denoted at 1 which includes an outer casing 3 and a mechanism chassis 2 secured in the outer casing 3. That portion of the internal spacing of the outer casing 3 the bottom of which is defined by most part of an upper face 2a of the mechanism chassis 2 except a front end portion serves as a cassette loading section in which a tape cassette 4 is removably loaded. It is to be noted that, when a direction is hereinafter referred to, it is based on FIG. 1 such that a leftward or a rightward direction is a leftward or a rightward direction in FIG. 1 and a forward or a rearward direction is a downward or an upward direction in FIG. 1.

Referring also to FIG. 3, a pair of reel base 5 and 5' are supported for rotation on the mechanism chassis 2 and have reel engaging shafts 6 and 6' and gear portions 7 and 7' supported for integral rotation on the reel engaging shafts 6 and 6', respectively. The reel engaging shafts 6 and 6' extend upwardly from locations of the mechanism chassis 2 spaced in the leftward and rightward direction from each other while the gear portions 7 and 7' are positioned below the mechanism chassis 2 adjacent a lower face of the mechanism chassis 2.

A take-up side input gear 8 is supported for rotation on the mechanism chassis 2. The take-up side input gear 8 is located substantially at a left rear location of the right-hand side reel base and is held in meshing engagement with the right-hand side reel base 5 (hereinafter referred to as "take-up side reel base").

A pair of capstans 9 and 9' are supported at locations of the mechanism chassis 2 spaced in the leftward and rightward direction from each other adjacent a front end portion of the mechanism chassis 2 such that most part thereof is projected upwardly above the mechanism chassis 2.

A motor 10 for driving the reel bases 5 and 5', capstans 9 and 9', a cam gear 84 which will be hereinafter described and so forth is secured to a right front corner of a lower face of the mechanism chassis 2, and a drive pulley 11 of a small diameter is secured to a rotary shaft 10a of the motor 10.

A pair of flywheels 12 and 12' are secured at central portions thereof to lower portions of the capstans 9 and 9', respectively. Each of the flywheels 12 and 12' has a belt receiving groove formed on an outer periphery thereof, and a gear 13 is secured to an upper face of the left hand side flywheel 12.

Figure 4:
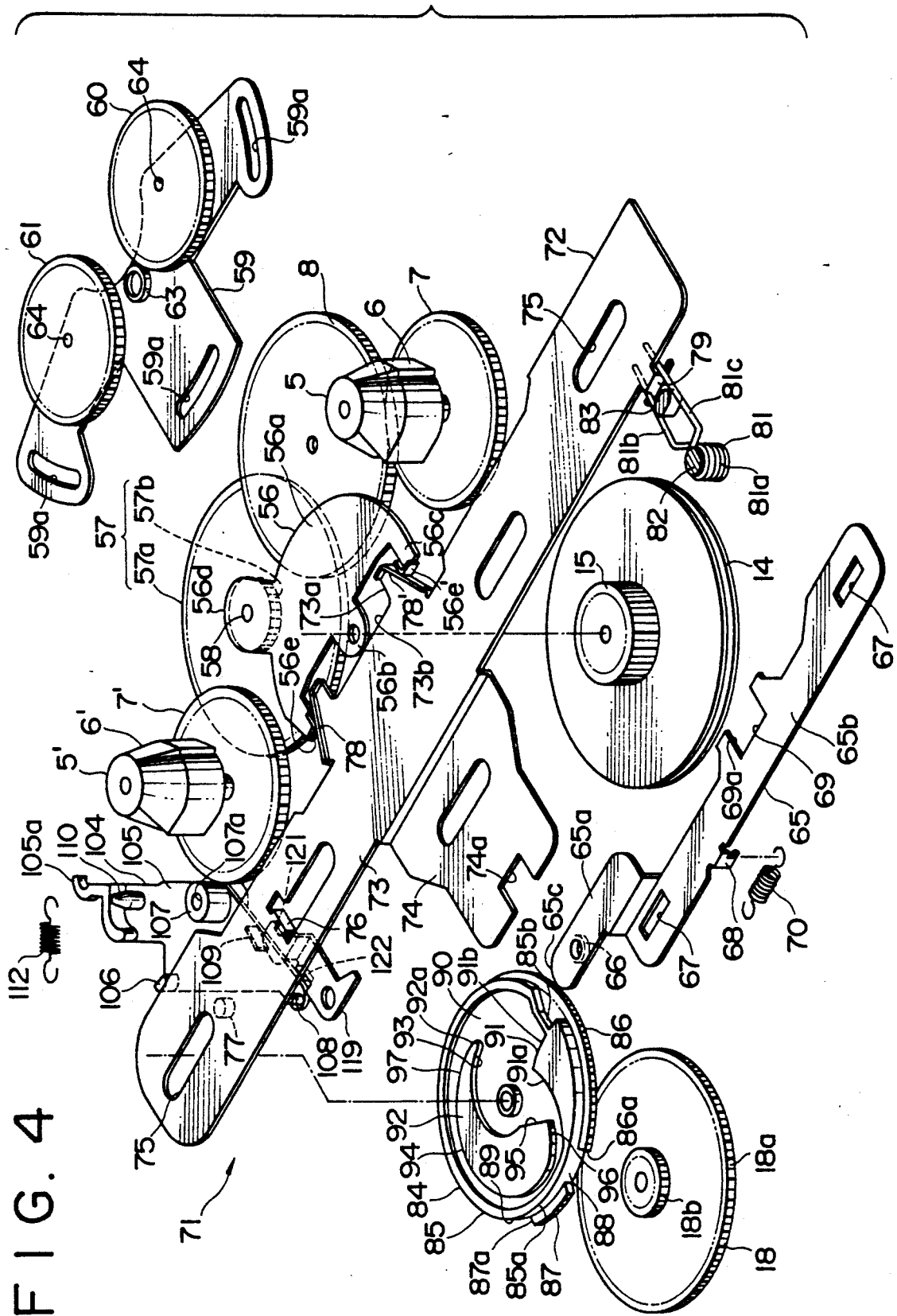
FIG. 4 is an enlarged exploded perspective view showing various elements of the mode changing over mechanism below the mechanism chassis.
Figure 5:
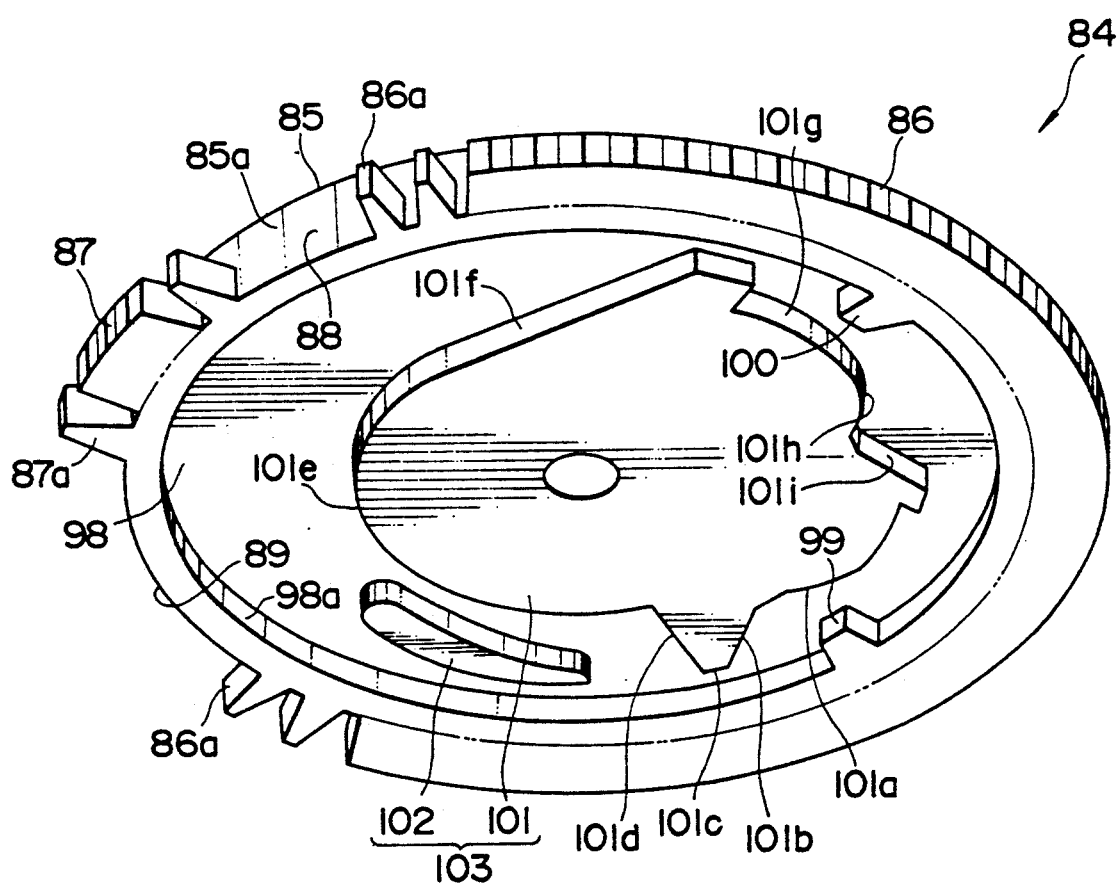
FIG. 5 is an enlarged perspective view of a cam gear of the mode changing mechanism.

Referring to FIGS. 3 and 4, an intermediate pulley 14 is supported for rotation at a lower portion of a support shaft 16 which is secured to and extends vertically downwardly from a substantially mid location of the mechanism chassis 2 between the reel bases 5 and 5'. An intermediate gear 15 of a comparatively small diameter is formed integrally on an upper face of the intermediate pulley 14.

An endless transmission belt 17 extends between and around the drive pulley 11, fly wheels 12 and 12' and intermediate pulley 14 such that the two fly wheels 12 and 12' may be rotated in directions opposite to each other.

A transmission gear 18 is supported for rotation on the lower face of the mechanism chassis 2 and has a pair of coaxial large and small gear portions 18a and 18b formed integrally thereon. The large gear portion 18a of the transmission gear 18 is located leftwardly rearwards of and normally held in meshing engagement with the gear 13 of the fly wheel 12.

It is to be noted that the motor 10 rotates, in any other mode of the tape player than a high speed feeding mode which will be hereinafter described, in a direction in which it rotates the right-hand side capstan 9 in the counterclockwise direction as viewed from above. Such direction of rotation of the motor 10 will be hereinafter referred to as "forward" direction, and the right-hand side capstan 9 will be hereinafter referred to as "normal mode side capstan" while the left-hand side capstan 9' will be hereinafter referred to as "reverse mode side capstan".

Thus, when the motor 10 rotates forwardly, the normal mode side capstan 9 is rotated in the counterclockwise direction as viewed from above while the reverse mode side capstan 9' is rotated in the clockwise direction; the intermediate pulley 14 and intermediate gear 15 are rotated in the clockwise direction; and the transmission gear 18 is rotated in the counterclockwise direction. On the contrary, when the motor 10 is rotated reversely, the intermediate pulley 14 and intermediate gear 15 are rotated in the counterclockwise direction.

Referring now to FIGS. 1, 6 and 8 to 10, a pair of leftwardly and rightwardly elongated pinch roller levers 19 and 19' are supported, at base end portions thereof remote from each other, for pivotal motion on a pair of support shafts 21 mounted uprightly at locations of the upper face adjacent the opposite left and right ends of the mechanism chassis 2. A pair of pinch rollers 20 and 20' are supported for rotation at pivotal end portions of the pinch roller levers 19 and 19', respectively.

A torsion spring 22 is fitted around the support shaft 21 for the right-hand side pinch roller lever 19 (hereinafter referred to as "normal mode side pinch roller lever") and normally biases the normal mode side pinch roller lever 19 in the counterclockwise direction as viewed from above. Meanwhile, another torsion spring 22 is fitted around the support shaft 21 for the left-hand side pinch roller lever 19' (hereinafter referred to as "reverse mode side pinch roller lever") and normally biases the reverse mode side pinch roller lever 19' in the clockwise direction. Thus, when the normal and reverse side pinch roller levers 19 and 19' are not acted upon by external force, arms 19a and 19'a which substantially forwardly from base end portions of the pinch roller levers 19 and 19' are abutted with and stopped by a pair of stopper lugs 2b formed on the mechanism chassis 2 to hold the pinch roller levers 19 and 19' at respective normal retracted positions in which they extend substantially in the leftward and rightward directions as seen in FIG. 1. When the pinch roller levers 19 and 19' are in the respective normal retracted positions, the pinch rollers 20 and 20' thereon are opposed to and spaced forwardly a little from the capstans 9 and 9', respectively, as seen in FIG. 1.

A pair of resiliently pressing springs 23 and 23' are provided for resiliently pressing the pinch rollers 20 and 20' against the capstans 9 and 9'. respectively and each has a pair of long arms 23b and 23c or 23'b and 23'c. The resiliently pressing springs 23 and 23' have coil portions 23a and 23'a, respectively, which are fitted around lower portions of substantially cylindrical portions 19b and 19'b of base end portions of the pinch roller levers 19 and 19', respectively. End portions of the arms 23b and 23'b of the resiliently pressing springs 23 and 23' are held in resilient contact with front faces of the pinch roller levers 19 and 19' while portions adjacent ends of the other arms 23c and 23'c are held in resilient contact with spring anchoring portions 19c and 19'c formed on front faces of pivotal end portions of the pinch roller levers 19 and 19', respectively.

The pinch roller levers 19 and 19' are pivoted rearwardly, that is, in the clockwise and counterclockwise directions, respectively, when end portions of the arms 23c and 23'c of the resiliently pressing springs 23 and 23' are pressed by a seesaw lever 50 which will be hereinafter described, and consequently, the pinch rollers 20 and 20' are resiliently pressed against the capstans 9 and 9', respectively.

Referring now to FIGS. 1, 2, 6, 8 to 10, 12 and 13, a head base 24 is supported on a magnetic head 25. The head base 24 is in the form of a flat plate elongated in the leftward and rightward direction, and the opposite end portions thereof are reduced in width comparing with the remaining portion. A support hole 24a is formed at a left end portion of the head base 24, and the support shaft 21 on which the reverse mode side pinch roller lever 19' is supported is fitted at a lower end portion thereof in the support hole 24a to support the head base 24 for pivotal motion on the support shaft 21.

A pair of elongated holes 26 and 27 are formed at a left end portion of a wide portion 24b of the head base 24 and extend in parallel to each other in arcs substantially in the forward and rearward directions. A spring anchoring lug 28 extends upwardly from a left end edge adjacent a front end of the wide portion 24b of the head base 24. A cylindrical regulating pin 29 is mounted uprightly at a substantially mid location of a portion adjacent a front side edge of the wide portion 24b of the head base 24.

An upwardly bent, low pressure receiving wall 30 is formed on the wide portion 24b of the head base 24 and extends from a rear half location of a right-hand side edge to a front edge of a right end portion of the head base 24.

A head holder 31 is secured to an upper face of the head base 24 adjacent a right end, and the magnetic head 25 is held on the head holder 31 in such orientation that a tape contacting race 25a thereof is directed substantially rearwardly. The magnetic head 25 is positioned intermediately between the pinch rollers 20 and 20'.

A return spring 32 in the form of a torsion spring is provided for the head base 24 and has a coil portion 32a fitted around a spring supporting pin 33 provided uprightly on the upper face of the mechanism chassis 2. An arm 32b of the return spring 32 is held in resilient contact with a right portion of a spring anchoring member 34 provided uprightly on the mechanism chassis 2 while the other arm 32c of the return spring 32 is held in resilient contact with a substantially rear portion of the spring anchoring portion 28 formed on the head base 24. The return spring 32 thus normally biases the head base 24 to pivot in the clockwise direction as viewed from above.

A sub lever 35 is provided for pushing, when a play mode is to be established, the head base 24 to move rearwardly. The sub lever 35 is in the form of a flat plate having a length a little smaller than the length of the head base 24 and extends substantially in the leftward and rightward direction. A support hole 35a is formed at a right end portion of the sub lever 34, and a lower end portion of the support shaft 21 on which the normal mode side pinch roller lever 19 is supported is fitted in the support hole 35a so that the sub lever 34 is supported for pivotal motion on the support shaft 21. The sub lever 35 has a pressing lug 36 formed upwardly at a left end edge thereof and further has an elongated hole 37 formed at a location thereof adjacent the left end and elongated substantially in the forward and rearward direction. A spring anchoring lug 38 is formed uprightly at a mid location of the sub lever 35 in a longitudinal direction.

A pair of guide shafts 39 are mounted uprightly at locations along a front side edge of the upper face of the mechanism chassis 2 in a spaced relationship in the leftward and rightward direction from each other.

A tension spring 40 extends between a lower portion of a right-hand side one of the guide shafts 39 and the spring anchoring lug 38 of the sub lever 35 to normally urge the sub lever 35 to pivot in the counterclockwise direction as viewed from above. When the sub lever 35 is not pushed rearwardly by an external force, a left end portion of a front side edge thereof is abutted with a stopper portion not shown formed on the front side edge of the mechanism chassis 2 so that the sub lever 35 is normally held at a stand-by position shown in FIG. 1, that is, at a position at which it extends leftwardly in a rather forward direction from the support shaft 21.

The pressure receiving wall 30 of the head base 24 is opposed from the rear to the pressing lug 36 of the sub lever 35, and when the head base 24 is not pushed rearwardly by the seesaw lever 50, it is positioned by the sub lever 35 since the pressure receiving wall 30 thereof is abutted with the pressing piece 36 of the sub lever 35. Accordingly, when the head base 24 is not pushed rearwardly by the seesaw lever 50 and the sub lever 35 is at its stand-by position, the head base 24 is held at an ejection position shown in FIG. 1. In this condition, the magnetic head 25 is positioned outside a cassette case 41 of a tape cassette 4 loaded in position in the cassette loading section.

Referring now to FIGS. 1, 2, 6, 8 to 10, 12 and 13, loading and ejection, that is, unloading, of a tape cassette 4 into and from the tape loading section of the tape player 1 are performed while the head base 24 is at the ejection position, and a loading operation comes to an end when the cassette case 41 of the tape cassette 4 is placed from substantially just above onto the upper face 2a of the mechanism chassis 2.

When a tape cassette 4 is placed onto the upper face 2a of the mechanism chassis 2, two tape reels 42 and 42' accommodated for rotation in the cassette case 41 thereof are engaged with the two reel bases 5 and 5', respectively, and the capstans 9 and 9' are individually inserted into a pair of capstan insertion holes (not shown) formed in a front portion of the cassette case 41.

A magnetic tape 43 is accommodated in the cassette case 41 of the tape cassette 4, and the opposite ends of the magnetic tape 43 are individually secured to and wound on the tape reels 42 and 42' while and an intermediate portion of the magnetic tape 43 is threaded in a recessed portion (not shown) formed on a front wall 41a of the cassette case 41 such that it is partially exposed outside the cassette case 41. When the tape cassette 4 is loaded in position in the cassette loading section of the tape player 1, the pinch rollers 20 and 20' are opposed to the capstans 9 and 9', respectively, while portions of the magnetic tape 43 on the opposite sides of the portion exposed outside the cassette case 41 are interposed between them.

An ejecting device 44 is provided for ejecting a tape cassette 4 from the cassette loading section of the tape player 1. The ejecting device 44 includes a control lever 45 slidable in the leftward and rightward direction, an ejecting button 49 for moving the control lever 45 to an ejection position at a right end of a range of movement of the control lever 45, and a cassette pushing up mechanism not shown for pushing up a tape cassette 4 when the control lever 45 is moved to the ejection position.

The control lever 45 is in the form of a plate elongated in the leftward and rightward direction, and a pair of guide holes 45a and 45a elongated in the leftward and rightward direction are formed at a portion adjacent a left end and another position adjacent a right end of the control lever 45. Upper portions of the guide shafts 39 are individually engaged for sliding movement in the elongated guide holes 45a so that the control lever 45 is supported for movement within a fixed range in the leftward and rightward direction on the guide shafts 39.

It is to be noted that a pair of flanges 39a (shown only in FIG. 2.) are formed on each of the guide shafts 39, and side edges of the elongated guide holes 45a of the control lever 45 are positioned between the paired flanges 39a of the guide shafts 39 to define the position of the control lever 45 in the vertical direction. Thus, the control lever 45 is positioned at the same height as an upper end of the regulating pin 29 of the head base 24.

The control lever 45 has a spring anchoring lug 46 formed upwardly on a rear side edge adjacent a right end thereof and has a pressure receiving lug 47 formed upwardly at a right end edge thereof. The control lever 45 further has a cam portion 48 formed at a left end portion thereof.

An end portion of an arm 22a of the torsion spring 22 which applies a resilient pivoting force to the normal mode side pinch roller lever 19 is held in resilient contact with a right portion of the spring anchoring lug 46 of the control lever 45 so that the control lever 45 is normally biased to move leftwardly by the torsion spring 22.

Thus, when the control lever 45 is not pushed in the rightward direction, it is held at a position of a left end of a range of movement thereof, that is, at a non-ejection position at which right ends of the elongated guide holes 45a are abutted with the guide shafts 39 as shown in FIG. 1.

The cam portion 48 is formed by cutting a corner portion of a left end portion of the control lever 45 substantially in an L-shape. In particular, a left end of a front edge of the control lever 45 extends to a location displaced rightwardly by some extent from a left end edge of the control lever 45, and an edge 48a (hereinafter referred to as pressure receiving edge) contiguous to the left end of the front edge of the control lever 45 extends in the forward and rearward direction while another portion 48b (hereinafter referred to as "arresting edge") extends rightwardly from a rear end of the pressure receiving edge 48a but is comparatively short. Further, an edge contiguous to a right end of the arresting edge 48b first extends toward the rear and is then bent leftwardly, and an edge 48c (hereinafter referred to as "arrest edge") ahead a left end of the leftwardly bent portion is formed such that it extends forwardly a little to the left side, that is, in a direction substantially in parallel to a locus of movement of the regulating pin 29 of the head base 24 upon pivotal motion. A yet further edge 48d extends leftwardly from a front end of the arrest edge 48c and is located a little rearwardly of a front end of the pressure receiving edge 48a.

It is to be noted that the distance at a location at which the distance between the arrest edge 48c and a corner at which the arresting edge 48b and the pressure receiving edge 48a connect to each other presents a smallest width is a little greater than the thickness of the regulating pin 29 of the head base 24.

When the head base 24 is at its ejection portion, the top end of the regulating pin 29 thereon is spaced forwardly a little from the front end of the arrest edge 48c of the cam portion 48 and is spaced by a comparatively small distance leftwardly from a front end portion of the pressure receiving edge 48a of the cam portion 48 (refer to FIG. 1).

The ejecting button 49 has a button portion disposed for movement in the leftward and rightward direction in a button receiving hole 3b formed in a front wall 3a of the outer casing 3 and has a pressing portion 49a extending from a rear face thereof. The pressing portion 49a of the ejecting button 49 is positioned such that an end portion thereof is opposed leftwardly to the pressure receiving lug 47 of the control lever 45.

Accordingly, when the ejecting button 49 is not pushed to the right, rightward movement of the ejecting button 49 is prevented by abutment of the pressing portion 49a thereof with the pressure receiving lug 47 of the control lever 45 which is at its non-ejection position. Consequently, the ejecting button 49 is held at its left end position (hereinafter referred to as "stand-by position") within a range of movement thereof, but when the ejecting button 49 is pushed toward the right, the pressing portion 49a thereof pushes the pressure receiving lug 47 of the control lever 45.

Figure 12:
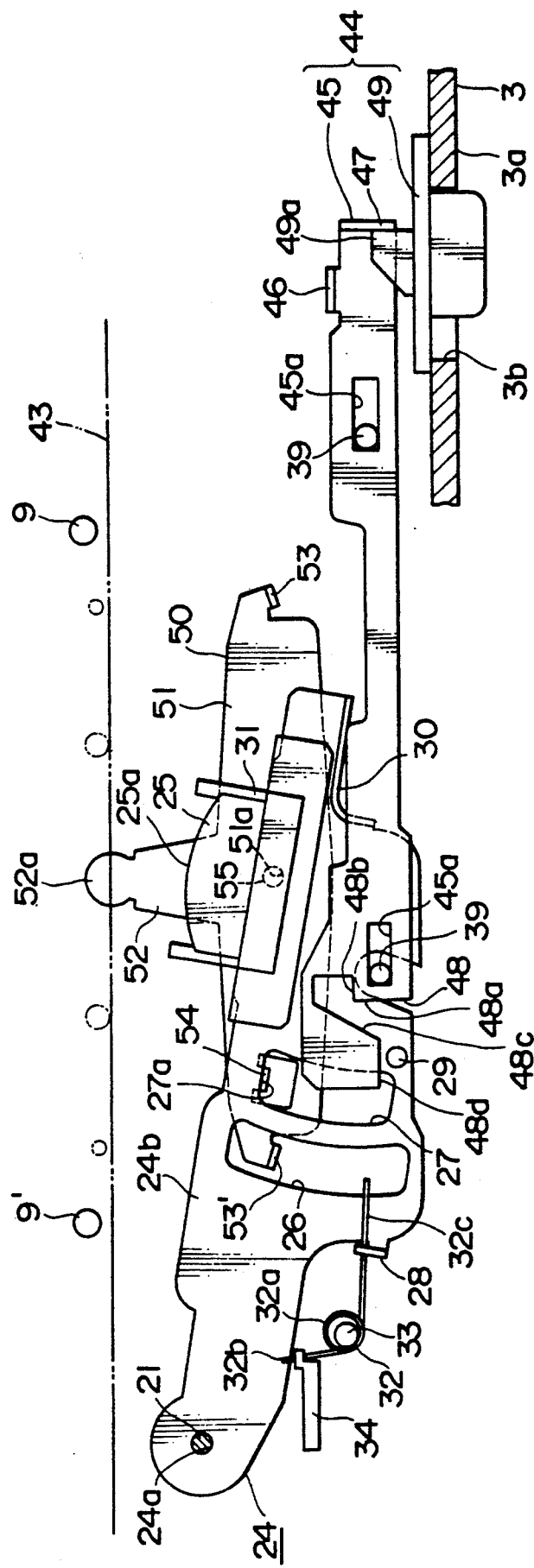
FIG. 12 is a top plan view of the mode changing over mechanism showing a head base returned to an ejection position as a result of operation of an ejecting button.

Thus, when the ejecting button 49 is moved from a position at which rightward movement of the control lever 45 is not prevented to another position at a right end of the range of movement thereof, that is, to a position (hereinafter referred to as "ejecting position") at which it is substantially abutted with a right end of the button receiving hole 3b as shown in FIG. 12, the control lever 45 is moved to the ejection position. Thereupon, a cassette pushing up portion of the cassette pushing up mechanism not shown is projected upwardly above the upper face of the mechanism chassis 2, and accordingly, if the control lever 45 is moved to its ejection position while a tape cassette 4 is loaded in position, then the cassette case 41 of the tape cassette 4 is pushed up by the cassette pushing up mechanism so that the tape cassette 4 is removed from the mechanism chassis 2.

It is to be noted that permission or inhibition of movement of the control lever 45 to the ejection position is controlled depending upon whether the position of the head base 24 is restricted or not, and when the position of the head base 24 is restricted by a mode changing over mechanism which will be hereinafter described, movement of the control lever 45 to the ejection position is inhibited to disable movement of the ejecting button 49 to the ejection position. Such control will be hereinafter described in detail.

Referring now to FIGS. 1, 3 and 8 to 11, the tape player 1 has, as modes which can be selectively established, a total of 5 modes including two play modest a stop mode in which the tape player 1 is inoperative, and two high speed feeding modes.

Figure 8:
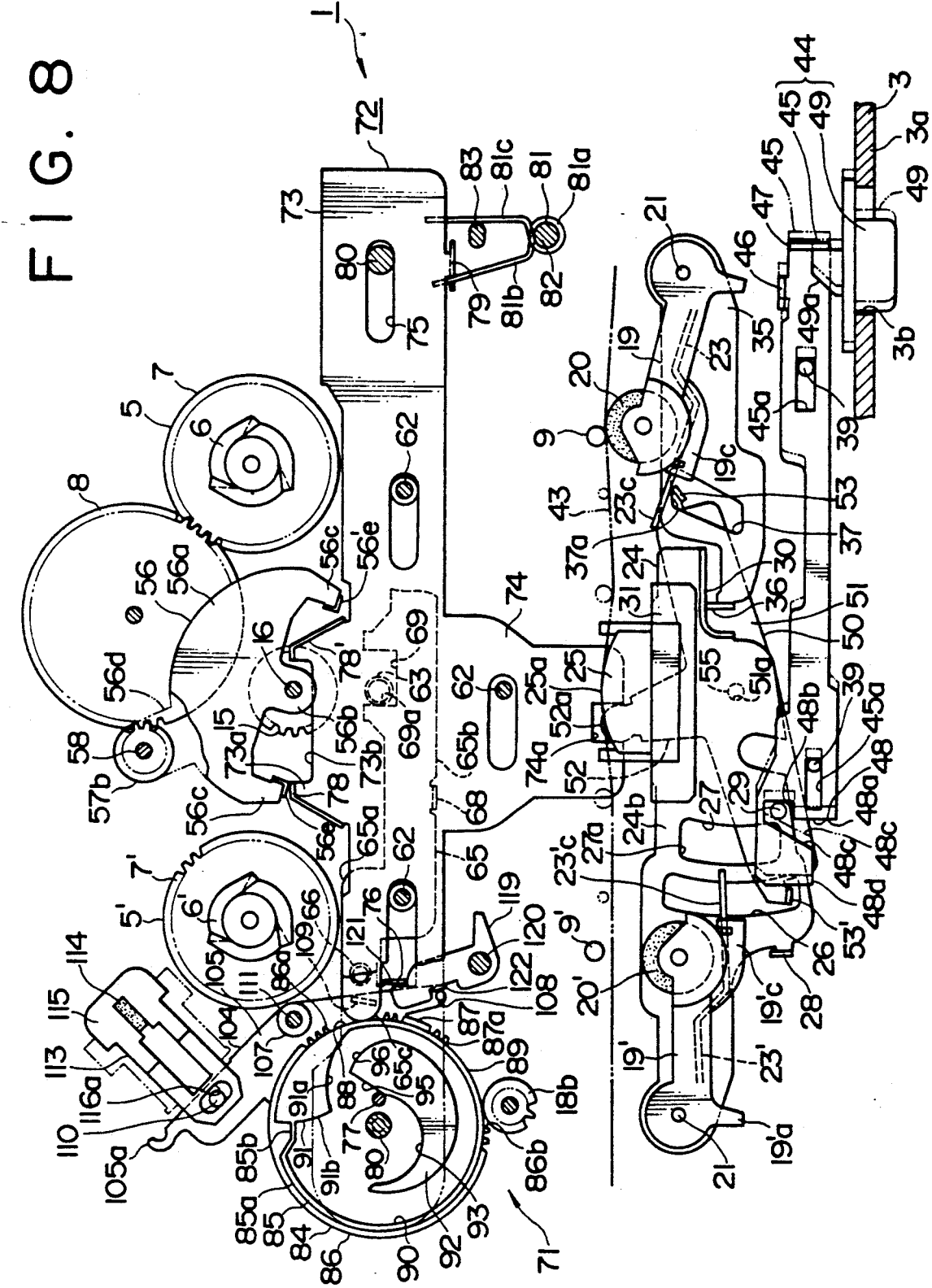
FIG. 8 is a top plan view of the mode changing over mechanism in a normal play mode.

In particular, the tape player 1 has a normal play mode in which recording or reproduction is performed while a magnetic tape 43 is fed in a direction (hereinafter referred to as "normal mode direction") in which it is supplied from the left-hand side reel 42' in a tape cassette 4 and wound up onto the right-hand side tape reel 42. FIG. 8 shows the tape player 1 in such normal play mode. The left-hand side reel 42' will thus be hereinafter referred to as supply reel, and the right-hand side reel 42 will be hereinafter referred to as take-up reel. The tape player 1 has a second play mode, that is, a reverse play mode in which recording or reproduction is performed while a magnetic tape 43 is fed in a direction (which will be hereinafter referred to as reverse mode direction) opposite to the normal mode direction.

Figure 9:
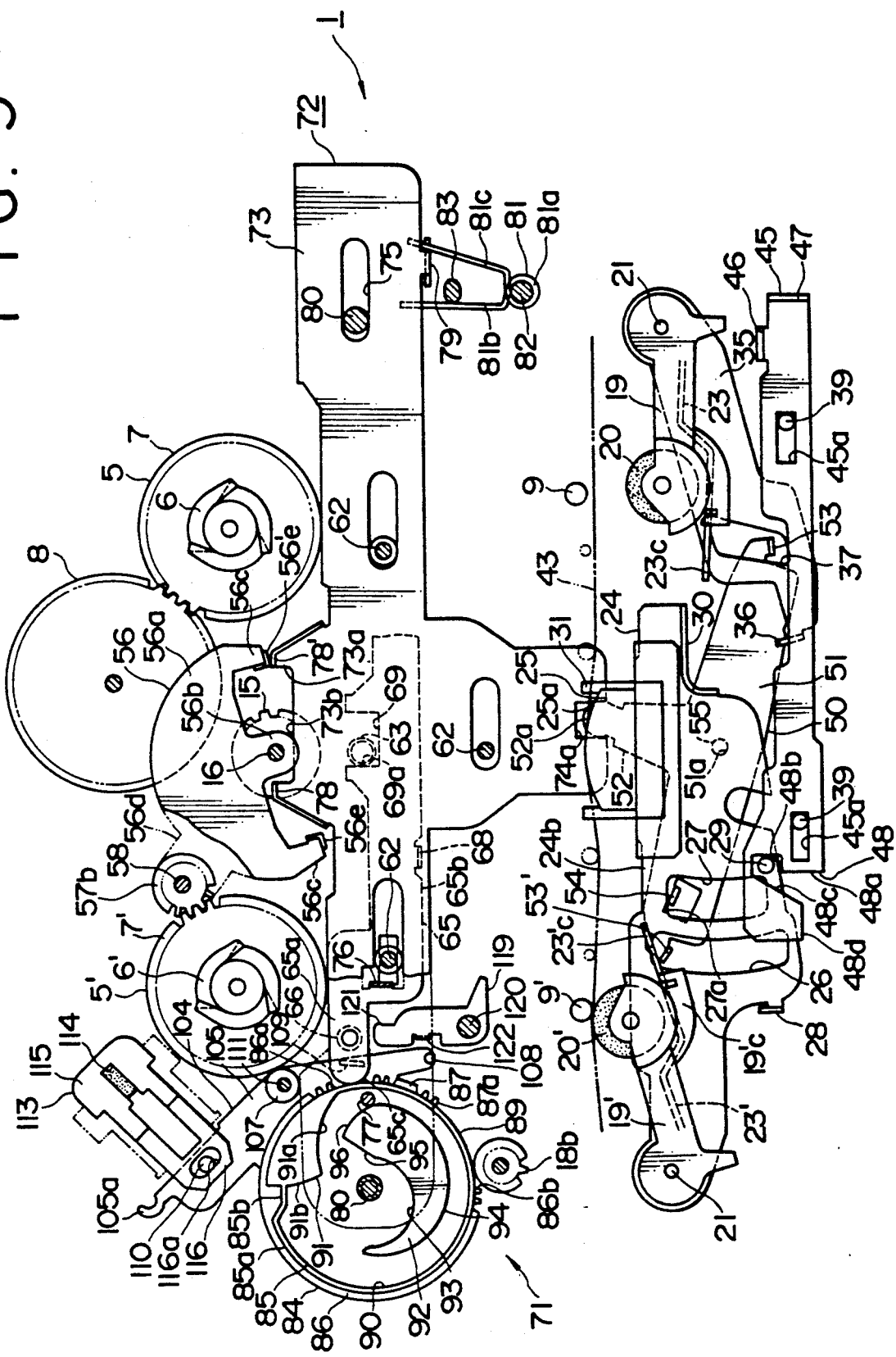
FIG. 9 is a top plan view of the mode changing over mechanism in a reverse play mode.

FIG. 9 shows the tape player 1 in such reverse play mode.

When a normal play mode is to be established, the normal mode side pinch roller lever 19 is pivoted to its advanced position shown in FIG. 8 to press the pinch roller 20 thereon against the normal mode side capstan 9 with the magnetic tape 43 interposed therebetween while the take-up side reel base 5 is rotated in its tape winding direction, that is, in the counterclockwise direction as viewed from above so that the magnetic tape 43 is fed at a fixed speed in the normal mode direction by the capstan 9 rotating in the counterclockwise direction and the pinch roller 20 resiliently pressed against the capstan 9 with the magnet tape 43 held therebetween. The magnetic tape 43 being fed in this manner is wound up onto the take-up reel 42.

On the other hand, when a reverse play mode is to be established, the reverse mode side pinch roller lever 19' is pivoted to its advanced position shown in FIG. 9 to press the pinch roller 20' thereon against the reverse mode side capstan 9' while the left-hand side reel base 5' (hereinafter referred to as supply side reel base) is rotated in its tape winding direction, that is, in the counterclockwise direction as viewed from above, and consequently, the magnetic tape 43 is fed at a fixed speed in the reverse mode direction by the capstan 9' rotated in the clockwise direction and the pinch roller 20' resiliently pressed against the capstan 9' with the magnetic tape 43 held therebetween. The magnetic tape 43 being fed in this manner is wound up onto the supply reel 42'. Thus, when either of such normal and reverse play modes as described above is established, the head base 24 is moved to its playing position shown in FIGS. 8 and 9 in which the magnetic head 25 contacts with the magnetic tape 43 so that recording or reading of a signal onto or from the magnetic tape 43 by the magnetic head 25 is performed.

Figure 10:
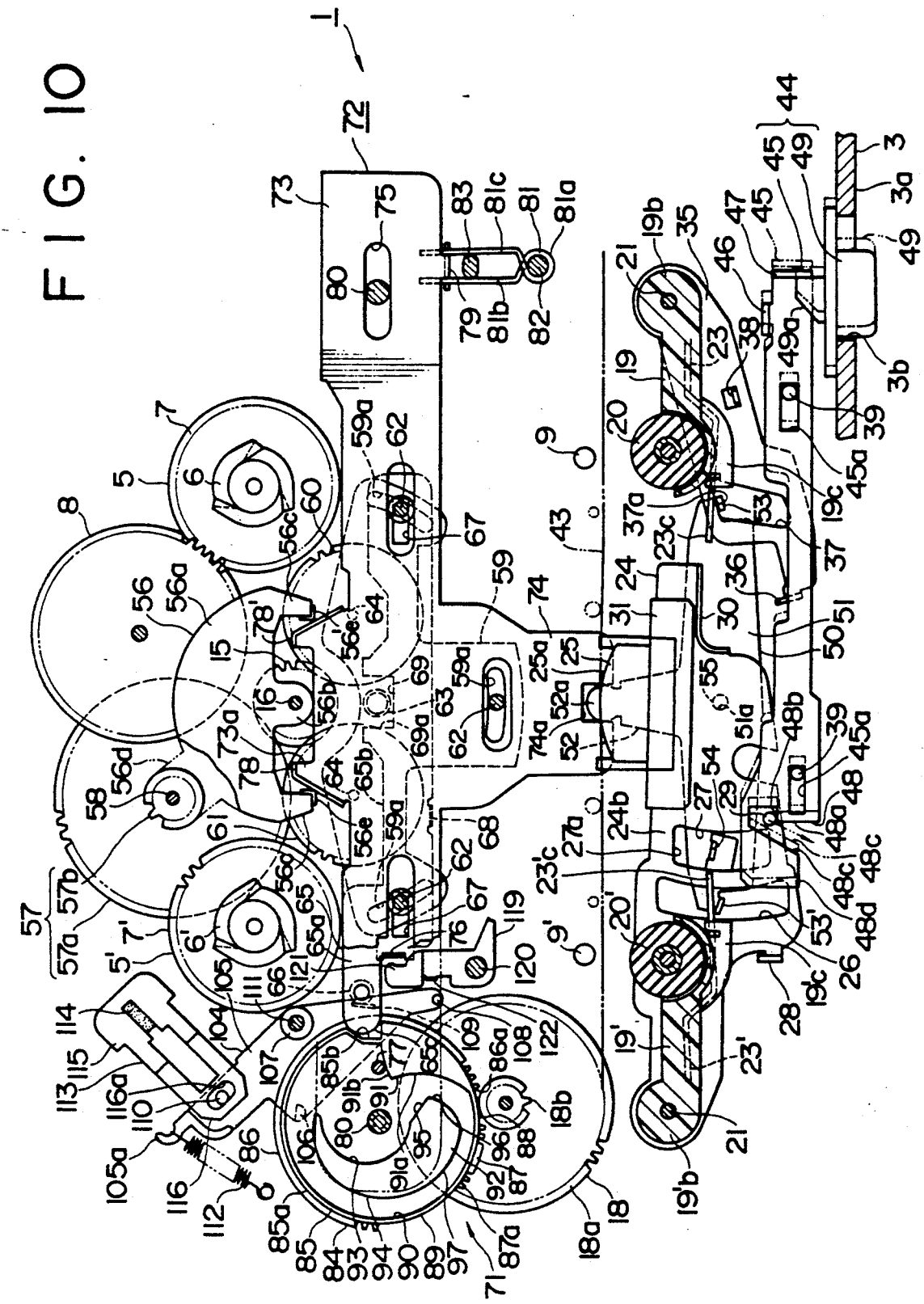
FIG. 10 is a plan view, partly broken, of the mode changing over mechanism in a stop mode.

When either of the normal and reverse play modes is cancelled, the tape player 1 enters a stop mode. FIG. 10 shows the tape player 1 in such stop mode. When a stop mode is to be established, the pinch roller levers 19 and 19' are returned to their respective retracted positions, and the head base 24 is returned to at its stopping position shown in FIG. 10 and thereafter held there. When the head base 24 is at its stopping position, the magnetic head 25 is partially accommodated in the cassette case 41 and the tape contacting face 25a thereof contacts lightly with or located very near to the magnetic tape 43.

It is to be noted that the head base 24 at the stopping position is returned to its ejection position substantially at the same time when the ejecting button 49 is operated in a stop mode so that the control lever 45 begins its movement toward the ejection position.

Figure 11:
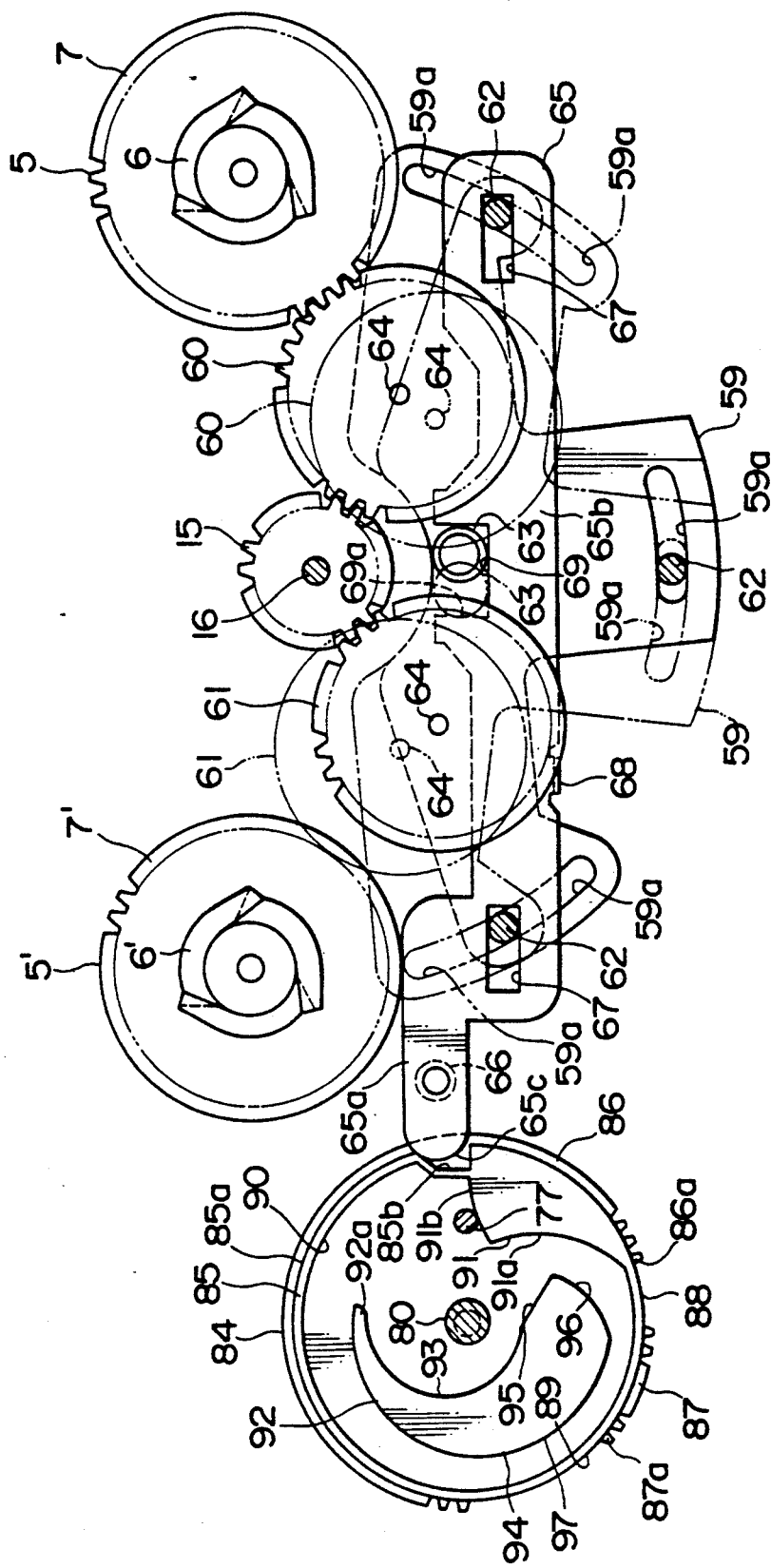
FIG. 11 is a top plan view showing part of the mode changing over mechanism in a high speed feeding mode.

The tape player 1 further has a high speed feeding mode in which a magnetic tape 43 is fed at a high speed in the normal mode direction and a rewinding mode in which the magnetic tape 43 is fed at a high speed in the reverse mode direction. FIG. 11 shows the tape player 1 in either of the high speed feeding modes. Either of the two high speed feeding modes is established by rotating the take-up side reel base 5 or supply side reel base 5' at a high speed in its tape winding direction when the tape player 1 is in a stop mode.

Referring to FIGS. 1 to 3, 6, 8 to 10 and 12, the head base 24 and pinch roller levers 19 and 19' are moved mainly by the seesaw lever 50. The position of the seesaw lever 50 is controlled by a mode changing over mechanism 71 which will be hereinafter described.

The seesaw lever 50 has a main portion 51 in the form of a plate elongated in the leftward and rightward direction and an arm 52 extending rearwardly from a mid portion of a rear edge of the main portion 51. A rear end 52a of the arm 52 terminates substantially in a disk. A support hole 51a is formed at a central location of the main portion 51 while a pair of pressing lugs 53 and 53' and a further pressing lug 54 are formed to extend upwardly from the opposite left and right end portions of the main portion 51 and a location adjacent the left end of the main portion 51, respectively.

A support shaft 55 is mounted uprightly at a substantially mid location of a front end portion of the mechanism chassis 2 and extends upwardly through the support hole 51a of the seesaw lever 52. The seesaw lever 50 is thus supported for pivotal motion in a horizontal plane on the upper face of the mechanism chassis 2.

It is to be noted that the seesaw lever 50 extends through an elongated hole 2c formed in the mechanism chassis 2 such that a most portion of the main portion 51 thereof except a base end portion of the arm 52 is positioned on the lower face side of the mechanism chassis 2, and the rear end portion 52a of the arm 52 is engaged for pivotal motion in an engaging recess 74a of a direction slider 72 which will be hereinafter described so that the position of the seesaw lever 50 is defined directly by the direction slider 72. The seesaw lever 50 is held, when the tape player 1 is in an initial condition or in a stop mode, at its neutral position in which the arm 52 thereof extends straightforwardly in the forward and rearward direction.

An upper portion of a rightmost one 53 (hereinafter referred to as "first pressing lug") among the three pressing lugs 53, 53' and 54 of the seesaw lever 50 of the seesaw lever 50 is fitted in the elongated hole 37 formed in the sub lever 35; an upper portion of the left pressing lug 53' (hereinafter referred to as "second pressing lug") is fitted in the left-hand side one 26 of the two elongated holes 26 and 27 formed in the head base 24; and an upper portion of the remaining pressing lug 54 (hereinafter referred to as "third pressing lug") is fitted in the remaining elongated hole 27 of the head base 24.

When the seesaw lever 50 is in its neutral position, that is, when the tape player 1 is in an initial condition or a stop mode, the first pressing lug 53 contacts lightly with a rear end edge 37a of the elongated hole 37 of the sub lever 35 and an end portion of the arm 23c of the resiliently pressing spring 23 provided for the normal mode side pinch roller lever 9; the second pressing lug 53' contacts lightly with an end portion of the arm 23'c of the other resiliently pressing spring 23' provided for the reverse mode side pinch roller lever 19'; and the third pressing lug 54 contacts, when the tape player 1 is in an initial condition, lightly with a rear end edge 27a of the right-hand side elongated hole 27 of the head base 24.

Referring to FIGS. 1 and 8 to 10, when a normal play mode is to be established, the seesaw lever 50 is pivoted in the counterclockwise direction as viewed from above. Consequently, the first pressing lug 53 thereon presses the rear end edge 37a of the elongated hole 37 of the sub lever 35 and the end portion of the arm 23c of the resiliently pressing spring 23 for the normal mode side pinch roller lever 19 substantially toward the rear so that the sub lever 35 and the normal mode side pinch roller lever 19 are pivoted in the clockwise direction, whereupon the pressing lug 36 of the sub lever 35 presses the pressure receiving wall 30 of the head base 24 substantially toward the rear to pivot the head base 24 toward the rear. Then, the seesaw lever 50 is stopped from pivotal motion when it comes to the position shown in FIG. 8 and is thereafter held at the position. When the seesaw lever 50 comes to the position, the head base 24 comes to the playing position and the pinch roller lever 19 comes to the advanced position.

On the other hand, when a reverse play mode is to be established, the seesaw lever 50 is pivoted in the clockwise direction as viewed from above. Consequently, the third pressing lug 54 thereon presses the rear end edge 27a of the right-hand side elongated hole 27 of the head base 24 substantially to the rear while the second pressing lug 53' thereon presses the arm 23'c of the resiliently pressing spring 23' of the reverse mode side pinch roller lever 19' substantially to the rear so that the head base 24 and the reverse mode side pinch roller lever 17' are individually pivoted to the rear. Then, the seesaw lever 50 is stopped from pivotal motion when it comes to the position shown in FIG. 9 and is thereafter held at the position. When the seesaw lever 50 comes to the position, the head base 24 is moved to the playing position and the reverse mode side pinch roller lever 19' is moved to the advanced position.

It is to be noted that the pinch roller 20 or 20' is abutted with the capstan 9 or 9' immediately before the pinch roller lever 19 or 19' comes to the advanced position, and from such position, the arm 23c or 23'c of the resiliently pressing spring 23 or 23' is moved rearwardly away from the spring anchoring portion 19c or 19'c of the pinch roller lever 19 or 19'. Consequently, the biasing force of the resiliently pressing spring 23 or 23' now acts as a force to resiliently pressing the pinch roller 20 or 20' against the capstan 9 or 9'.

If the seesaw lever 50 is returned to its neutral position from the pivoted position described above, then the pinch roller lever 19 or 19' is returned to its retracted position by the biasing force of the torsion spring 22 or 22', but returning of the head base 24 is stopped when it comes to a position rearwardly to some extent from the ejection position as the regulating pin 29 thereon is abutted with the arresting edge 48b of the cam portion 48 of the control lever 45.

In particular, when the head base 24 is moved from the ejection position to the playing position, the regulating pin 29 thereon is moved rearwardly while pushing the pressure receiving edge 48a of the cam portion 48 of the control lever 45 rearwardly. Consequently, the control lever 45 is displaced rightwardly a little from the ejection position to such a non-arresting position as indicated by an alternate long and two short dashes line in FIG. 10 while the regulating pin 29 remains in contact with the pressure receiving edge 48a. Then, when the regulating pin 29 is disengaged from the pressure receiving edge 48a, the control lever 45 is returned leftwardly to the ejection position, and the head base 24 comes to the playing position immediately after the regulating pin 29 is disengaged from the pressure receiving edge 48a. Accordingly, when the head base 24 is moved to the playing position, the arresting edge 48b of the cam portion 48 of the control lever 45 is positioned comparatively in the proximity in front of the regulating pin 29. Consequently, when the seesaw lever 50 is returned to the neutral position to release the head base 24, the head base 24 is not returned to the ejection position but is returned to and thereafter held at a position at which the regulating pin 29 is abutted with the arresting edge 48b. The position of the head base 24 then is the stopping position in which the magnetic head 25 is partially accommodated in the cassette case 41 and is contacted lightly with or located very near to the magnetic tape 43 as described hereinabove (refer to FIG. 10).

When the control lever 45 is moved rightwardly, that is, to the non-arresting position while the head base 24 is at the stopping position, the arresting edge 48b of the cam portion 48 thereof is displaced rightwardly from the lotus of movement of the regulating pin 29, and consequently, holding of the head base 24 at the stopping position by the control lever 45 is cancelled. Consequently, the head base 24 is returned to the ejection position (refer to FIG. 12).

It is to be noted that, although also movement of the head base 24 from the stopping position to the playing position is performed substantially similarly to the movement from the ejection position, rearward movement of the head base 24 in this instance is started at a point of time when the pressing lug 36 of the sub lever 35 is abutted with the pressure receiving wall 30 of the head base 24 after the seesaw lever 50 starts its pivotal motion or at another point of time when the third pressing lug 54 of the seesaw lever 50 is abutted with the rear end edge 27a of the elongated hole 27 of the head base 24.

As described hereinabove, ejection of a tape cassette is achieved by moving the ejecting button 49 to the ejecting position.

Figure 13:
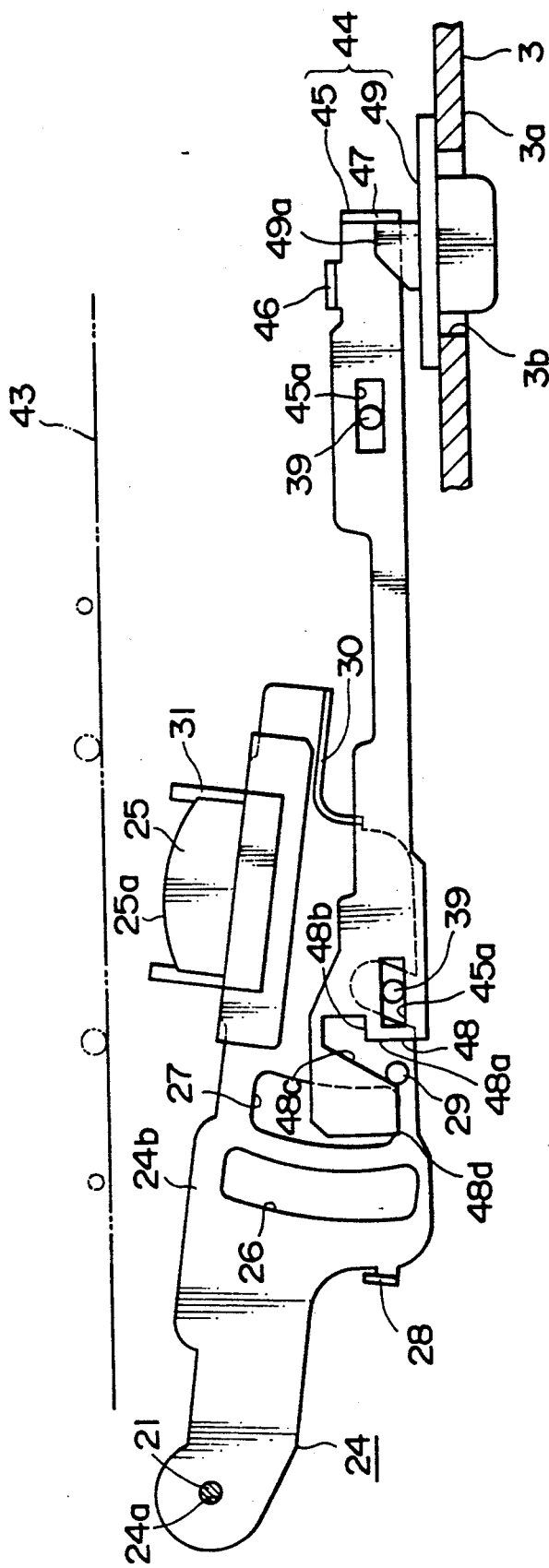
FIG. 13 is a top plan view of the mode changing over mechanism in a condition wherein an ejecting operation is disabled while the head base is being advanced from the ejection position.

Referring to FIGS. 1, 8 and 13, movement of the ejecting button 49 to the ejecting position is allowed only when the tape player 1 is in a stop mode or in an initial condition, but is inhibited while the head base 24 is being moved rearwardly farther than the ejecting position or is at the playing position.

In particular, while the head base 24 is being moved from the ejection position or stopping position toward the playing position or when the head base 24 is at the playing position, the position of the head base 24 is controlled by the seesaw lever 50, but when the head base 24 is at a position between the playing position and a position moved rearwardly a little from the ejection position as shown in FIG. 13, since the regulating pin 29 thereon is positioned rightwardly of the arrest edge 48c of the cam portion 48 of the control lever 45, even if it is tried to push the ejecting button 49 rightwardly from the position to move the control lever 45 to the ejection position, the control lever 45 is abutted, when it comes to the non-arresting position or a position near the non-arresting position, at the arrest edge 48c thereof with the regulating pin 29 as shown in FIG. 13 and as indicated by an alternate long and two short dashes line in FIG. 8 so that it is prevented from being moved rightwardly any more. Consequently, the ejecting button 49 is inhibited from moving rightwardly to the ejecting position.

To the contrary, when the tape player 1 is in an initial condition, since the head base 24 is at the ejection position and the regulating pin 29 thereof is positioned at a position displaced forwardly from the locus of movement of the arrest edge 48c of the cam portion 48 of the control lever 45, movement of the control lever 45 to the ejecting position is not inhibited. However, when the tape player 1 is in a stop mode, when the regulating pin 29 is positioned rightwardly of the arrest edge 48c, since the head base 24 is not restricted by the seesaw lever 50, when the control lever 45 comes to the non-arresting position, the head base 24 is allowed to be moved to the ejection position so that the regulating pin 29 is moved to a position displaced forwardly from the lotus of movement of the arrest edge 48c. Consequently, movement of the control lever 45 to the ejection position is allowed.

Thus, ejection of the tape cassette 4 is permitted only when the tape player 1 is an initial condition or a stop mode, but is inhibited for a period of time after the head base 24 starts its movement from the ejection position until a stop mode is established. Consequently, while the magnetic head 25 is being advanced to the magnetic tape 43 and while the magnetic head 25 remains in contact with the magnetic head 43, ejection of the tape cassette 4 is inhibited.

Referring to FIGS. 3, 4 and 8 to 10, an oscillating gear 57 for a low speed for selectively transmitting a turning force of the motor 10 to the take-up side reel base 5 or the supply side reel base 5' when the tape player 1 is in a play mode is supported on an oscillating lever 56 for a low speed.

The oscillating lever 56 has a main portion 56a in the form of a flat plate of a substantially semicircular shape, a support piece 56b extending forwardly from a central portion a front edge of the main portion 56a which extends substantially linearly, a pair of control pieces 56c and 56c extending forwardly from the opposite left and right ends of the front edge of the main portion 56a and a gear supporting piece 56d extending substantially to the left rear from an arcuate side edge of the main portion 56a. The oscillating lever 56 is supported at the support piece 56b thereof for pivotal motion at an upper end portion of the support shaft 16 on which the intermediate pulley 14 is supported.

A pair of pressure receiving walls 56e and 56'e each in the form of a bent lug are formed uprightly at inner corners of front ends of the control pieces 56c of the oscillating lever 56.

A gear supporting shaft 58 is mounted vertically downwardly on the gear supporting piece 56d of the oscillating lever 56, and the oscillating gear 57 for a low speed is supported for rotation on the gear supporting shaft 58. The oscillating gear 57 for a low speed has two large and small gears 57a and 57b disposed in a coaxial relationship with each other and coupled to each other by way of a torque limiter of the frictional contact type not shown so that they may rotate integrally with each other. The large gear 57a of the oscillating gear 57 for a low speed is held in meshing engagement with the intermediate gear 15 while the small gear 57b is positioned between the gear portion 7' of the supply side reel gear 5' and the take-up side input gear 8.

The position of oscillating lever 56 for a low speed of such construction is controlled by the direction slider 72 which will be hereinafter described, and when the tape player is in any other condition than a play mode, the oscillating lever 56 for a low speed is held at its neutral position shown in FIGS. 3 and 10, that is, at a position at which the small gear 57b of the oscillating gear 57 for a low speed is positioned substantially midway between the gear portion 7' and the take-up side input gear 8, but when a normal play mode is to be established, the oscillating lever 56 for a low speed is pivoted in the clockwise direction so that the small gear 57b is brought into meshing engagement with the take-up side input gear 8 as shown in FIG. 8. On the contrary, when a reverse play mode is to be established, the oscillating lever 56 for a low speed is pivoted in the counterclockwise direction so that the small gear 57b is brought into meshing engagement with the gear portion 7' of the supply side reel base 5' as shown in FIG. 9.

Thus, since the motor 10 rotates when the tape player 1 is in a play mode, the intermediate gear 15 is rotated in the clockwise direction while the oscillating gear 57 for a low speed is rotated in the counterclockwise direction. Accordingly, when the tape player 1 is in a normal play mode, the take-up side input gear 8 is rotated in the clockwise direction while the take-up side reel base 5 is rotated in the counterclockwise direction, that is, in its tape winding direction. But when the tape player 1 is in a reverse play mode, the supply side reel base 5' is rotated in the clockwise direction, that is, in its tape winding direction. Rotation of the intermediate gear 15 is considerably reduced in speed while it is transmitted by way of a motion transmission system including the large gear 57a—small gear 57b—take-up side input gear 8 or gear portion 7', and consequently, the reel base 5 or 5' is rotated at a comparatively low speed in its tape winding direction.

Referring now to FIGS. 3, 4 and 7 to 11, a pair of oscillating gears 60 and 61 for a high speed for selectively transmitting rotation of the motor 10 to the reel bases 5 and 5' in a high speed feeding mode are mounted on an oscillating lever 59 for a high speed.

The oscillating lever 59 for a high speed is in the form of a substantially T-shaped plate elongated in the leftward and rightward direction and has three elongated guide holes 59a formed at the opposite left and right end portions and a front end portion thereof such that they extend arcuately along a circle centered at the support shaft 16. Three support shafts 62 are mounted vertically downwardly on the lower face of the mechanism chassis 2 and fitted for sliding movement in the elongated guide holes 59a so that the oscillating lever 59 for a high speed is supported for pivotal motion around the center provided by an axis of the intermediate gear 15 in a horizontal plane. With regard to the vertical direction, the oscillating lever 59 for a high speed is positioned a little lower than the gear portions 7 and 7' of the reel bases 5 and 5'. Further, the oscillating lever 59 for a high speed is positioned such that an intermediate portion thereof in the leftward and rightward direction is located forwardly of and opposed to the support shaft 16 on which the intermediate pulley 14 is supported.

A circular regulation projection 63 is formed at a central location of a rear end portion of the oscillating lever 59 for a high speed in the leftward and rightward direction. A pair of gear supporting shafts 64 are mounted uprightly at locations of a rear end portion of the oscillating lever 59 for a high speed spaced leftwardly and rightwardly from the regulation projection 63. The two oscillating gears 60 and 61 for a high speed are supported for rotation on the gear supporting shafts 64 and the right-hand side oscillating gear 60 for a high speed (hereinafter referred to as "take-up side oscillating gear for a high speed") is located substantially leftwardly forwards of and opposed to the gear portion 7 of the take-up side reel base 5 while the left-hand side oscillating gear 61 for a high speed (hereinafter referred to as "supply side oscillating gear for a high speed") is located substantially rightwardly forwards of and opposed to the gear portion 7' of the supply side reel base 5'.

The oscillating gears 60 and 61 for a high speed are normally held in meshing engagement with the intermediate gear 15 and held in frictional contact with the oscillating lever 59 for a high speed by way of friction means not shown. Accordingly, when the intermediate gear 15 is rotated in the clockwise direction, a turning force in the clockwise direction is applied to the oscillating lever 59 for a high speed, but when the intermediate gear 15 is rotated in the counterclockwise direction, a turning force in the counterclockwise direction is applied to the oscillating lever 59 for a high speed.

Thus, since the intermediate gear 15 is rotated in the counterclockwise direction when the motor 10 rotates reversely, the oscillating lever 59 for a high speed is pivoted in the counterclockwise direction so that the take-up side oscillating gear 60 for a high speed is brought into meshing engagement with the gear portion 7 of the take-up side reel base 5 as indicated by a solid line in FIG. 11, and simultaneously when such meshing engagement takes place, ends of the guide elongated holes 59a in the clockwise direction are abutted with the support shafts 62 so that the oscillating lever 59 for a high speed is prevented from being pivoted further in the counterclockwise direction. Consequently, the oscillating gears 60 and 61 for a high speed are rotated in the clockwise direction, and the take-up side oscillating gear 60 for a high speed rotates the take-up side reel base 5 in the counterclockwise direction, that is, in its tape winding direction. The tape player 1 is now in a high speed feeding mode.

On the other hand, when the motor 10 rotates forwardly, the intermediate gear 15 is rotated in the clockwise direction, and consequently, the oscillating lever 59 for a high speed is pivoted in the clockwise direction so that the supply side oscillating gear 61 for a high speed is brought into meshing engagement with the gear portion 7' of the supply side reel base 5' as indicated by an alternate long and two short dashes line in FIG. 11. Simultaneously when such meshing engagement takes place, ends of the elongated guide holes 59a in the counterclockwise direction are abutted with the support shafts 62 so that the oscillating lever 59 for a high speed is prevented from being pivoted further in the clockwise direction while the oscillating gears 60 and 61 for a high speed are rotated in the counterclockwise direction and the supply side oscillating gear 61 for a high speed rotates the supply side reel base 5' in the clockwise direction, that is, in its tape winding direction. The tape player 1 is now in a rewinding mode.

The reduction ratio upon transmission of rotation of the intermediate gear 15 to the oscillating gear 60 or 61 for a high speed is set comparatively low, and accordingly, the oscillating gears 60 and 61 are rotated at a comparatively high speed so that the reel base 5 or 5' is rotated at a high speed in its tape winding direction.

Referring now to FIGS. 3, 4 and 7 to 11, a limiting slider 65 is provided for limiting, to a fixed position, pivotal motion of the oscillating lever 59 for a high speed in the clockwise direction when a play mode is to be established.

The limiting slider 65 is in the form of a plate of a comparative small width elongated in the leftward and rightward direction. A left end portion 65a of the limiting slider 65 extends rearwardly from and positioned at a rather higher position than the remaining portion 65b. A pressure receiving projection 66 is formed in a downwardly protruded condition at a location adjacent a left end of the higher portion 65a. Meanwhile, a pair of elongated guide holes 67 elongated in the leftward and rightward direction are formed at the opposite left and right end portion of the portion 65b other than the left end portion 65a while a spring anchoring lug 68 is formed at a front side edge of adjacent a left end of the portion 65b and extends downwardly. The limiting slider 65 has a greater width at a substantially mid portion of the portion 65b, and a substantially channel-shaped recess 69 is formed along a rear edge of the width portion.

Of the three support shafts 62 on which the oscillating lever 59 for a high speed is supported, two which are arranged in the leftward and rightward direction are engaged for sliding movement in the elongated guide holes 67 of the limiting slider 65. Consequently, the limiting slider 65 is supported for movement within a fixed range in the leftward and rightward direction. A tension spring 70 extends between the left-hand side one of the two support shafts 62 and the spring anchoring lug 68 of the limiting slider 65 to normally bias the limiting slider 65 leftwardly.

The regulation projection 63 formed on the oscillating lever 59 for a high speed is positioned in the recess 69 of the limiting slider 65 with some play so that the limiting slider 65 may be moved between a limiting position shown in FIGS. 8 and 9, that is, a position at which a left-hand side edge 69a of the recess 69 thereof contacts with the regulation projection 63 of the oscillating lever 59 for a high speed when the oscillating lever 59 for a high speed is at an intermediate position within a range of pivotal movement thereof and a non-limiting position shown in FIG. 3, that is, a position at which the regulation projection 63 of the oscillating lever 59 for a high speed when it is at the intermediate position in the range of pivotal movement thereof is positioned at a substantially central position of the recess 69. Such position control of the limiting slider 65 between the two positions is performed by a trigger lever 104 and a cam gear 84 which will be hereinafter described.

The limiting slider 65 is held, when the tape player is in an initial condition and in a stop mode, at the non-limiting position, and when a play mode is to be established, the limiting slider 65 is moved to and thereafter held at the limiting position, but when a stop mode is to be established, the limiting slider 65 is returned to the non-limiting position.

Thus, when the tape player 1 is in an initial condition or in a stop mode, the regulation projection 63 of the oscillating lever 59 for a high speed can be displaced to some degree in the leftward and rightward direction within the range of the recess 69 of the limiting slider 65. Accordingly, in this condition, the oscillating lever 59 for a high speed is permitted to pivot the oscillating gear 60 or 61 to a position at which it meshes with the gear portion 7 or 7' of the reel base 5 or 5'. On the other hand, when the tape player 1 is in a play mode, while a pivoting force in the clockwise direction is applied to the oscillating lever 59 for a high speed, since such pivotal motion is limited to a position at which the regulation projection 63 is abutted with the left side edge 69a of the recess 69, that is, an intermediate position in the range of pivotal movement, the supply side oscillating gear 61 for a high speed is inhibited from being meshed with the gear portion 7' of the supply side reel base 5'.

Referring now to FIGS. 1, 3 to 5, 7 to 11 and 15 to 21, the mode changing over mechanism 71 is provided for controlling the positions of the seesaw lever 50, oscillating lever 56 for a low speed, limiting slider 65 and so forth to selectively establish one of a normal play mode, a reverse play mode and a stop mode. The mode changing over mechanism 71 includes, in addition to the slidably movable direction slider 72, cam gear 84 and trigger lever 104 for moving the direction slider 72 described above, a solenoid plunger 113 and so forth.

Referring to FIGS. 3, 4, 7 to 10 and 15 to 21, the direction slider 72 has a main portion 73 in the form of a flat plate elongated in the leftward and rightward direction and an arm 74 extending forwardly from a mid portion of a front edge of the main portion 73 and having a great width in the leftward and rightward direction. The main portion 73 of the direction slider 72 has a pair of elongated guide holes 75 formed at the opposite left and right end portions thereof and elongated in the leftward and rightward direction and further has a comparatively small pressure receiving lug 76 extending downwardly from a substantially mid location thereof between the center in the leftward and rightward direction and the left end. The main portion 73 further has a cylindrical control pin 77 mounted on a lower face at a location thereof leftwardly in the neighborhood of the left-hand side elongated guide hole 75.

An intermediate portion 73a of a rear portion of the main portion 73 of the direction slider 72 in the leftward and rightward direction has a transversely elongated, substantially bi-laterally symmetrical trapezoidal shape wherein it is projected rearwardly from the remaining portion. The opposite left and right end portions of a rear edge of the portion 73a (hereinafter referred to as a "regulating portion") having such trapezoidal shape and portions 78 and 78' (each hereinafter referred to as "regulating edge") extending along inclined edges contiguous to such left and right end portions are formed such that they may make low walls by bending them upwardly. It is to be noted that a transversely elongated recess 73b is formed at a portion of the rear edge of the regulating portion 73a except the opposite left and right end portions.

An engaging recess 74a is formed at the center of a front edge of the arm 74 of the direction slider 72.

A spring anchoring lug 79 is formed vertically downwardly from the front side edge of the main portion 73 of the direction slider 72 adjacent the right end.

A pair of supporting pins 80 are mounted on the lower face of the mechanism chassis 2 and fitted engaged for sliding movement in the guide elongated holes 75 of the direction slider 72 so that the direction slider 72 is supported for movement within a fixed range in the leftward and rightward direction.

Referring to FIGS. 1, 3 and 8 to 10, when the direction slider 72 is at its stopping position shown in FIGS. 3 and 10, that is, at an intermediate position in the range of movement, the regulating portion 73a thereof contacts with a portion of the oscillating lever 56 for a low speed between the two pressure receiving edges 56e and 56e', while inclined edges of the regulating edges 78 and 78' thereof contact with the corner portions of the pressure receiving edges 56e and 56e', and consequently, the oscillating lever 56 for a low speed is prevented from pivotal motion and held at its neutral position.

Then, if the direction slider 72 is moved leftwardly from the neutral position, the left-hand side regulating edge 78 (hereinafter referred to as "first regulating edge") presses the left-hand side pressure receiving edge 56e of the oscillating lever 56 for a low speed substantially toward the left rear to pivot the oscillating lever 56 for a low speed in the clockwise direction. Then, when the corner portion of the pressure receiving edge 56e rides over a rear edge of the first regulating edge 78, the pivotal motion of the oscillating lever 59 for a low speed in the clockwise direction comes to an end. Substantially at the same time, the direction slider 72 comes to its normal mode position shown in FIG. 8, that is, a position substantially at the left end of the range of movement of the same. As a result of pivotal motion of the oscillating lever 56, the small gear 57b of the oscillating gear 57 for a low speed is brought into meshing engagement with the take-up side input gear 8.

On the other hand, when the direction slider 72 is moved rightwardly from the neutral or stopping position, the right-hand side regulating edge 78'. (hereinafter referred to as "second regulating edge") thereof presses the right-hand side pressure receiving edge 56e' of the oscillating lever 56 for a low speed substantially to the right rear to pivot the oscillating lever 56 for a low speed in the counterclockwise direction. Then, when the corner portion of the pressure receiving edge 56e' rides over to a rear edge of the second regulating edge 78', the pivotal motion of the oscillating lever 56 for a low speed in the counterclockwise direction comes to an end. Substantially at the same time, the direction slider 72 comes to its reverse mode position shown in FIG. 9, that is, a position near the right end in the range of movement thereof. As a result of pivotal motion of the oscillating lever 56, the small gear 57b of the oscillating lever 57 for a low speed is brought into meshing engagement with the gear portion 7' of the supply side reel base 5'.

It is to be noted that, when the direction slider 72 is to be returned from the normal mode position to the stopping position, the second regulating edge 78' thereof presses the right-hand side pressure receiving edge 56e' of the oscillating lever 59 for a low speed to return the oscillating lever 56 for a low speed to the neutral position, but when the direction slider 72 is to be returned from the reverse mode position to the stopping position, the first regulating edge 78 thereof presses the left-hand side pressure receiving edge 56e of the oscillating lever 56 for a low speed to return the oscillating lever 56 for a low speed to the neutral position.

The disk-shaped rear end portion 52a of the arm 52 of the seesaw lever 50 is engaged for pivotal motion in the engaging recess 74a formed in the arm 74 of the direction slider 72. Accordingly, the position of the seesaw lever 50 is controlled by the direction slider 72, and when the direction slider 72 is moved leftwardly, a right-hand side edge of the engaging recess 74a thereof presses the rear end portion 52a of the seesaw lever 50 toward the left to pivot the seesaw lever 50 in the counterclockwise direction. But, when the direction slider 72 is moved rightwardly, a right-hand side edge of the engaging recess 74a presses the rear end portion 52a of the seesaw lever 50 toward the right to pivot the seesaw lever 50 in the clockwise direction.

When the direction slider 72 is at the stopping position, the seesaw lever 50 is held at its neutral position. When the seesaw lever 50 is in the neutral position, position control of the head base 24 by the seesaw lever 50 is not performed, and consequently, the head base 24 remains at the ejection position or the stopping position. On the other hand, when the direction slider 72 is moved to the normal mode position, the seesaw lever 50 is pivoted in the counterclockwise direction, but when the direction slider 72 is moved to the reverse mode position, the seesaw lever 50 is pivoted in the clockwise direction. In either case, the seesaw lever 50 moves the head base 24 to the playing position. Then, while the direction slider 72 is held at the normal mode position or the reverse mode position, also the seesaw lever 50 is held at the position after it has moved the head base 24 to the playing position. Then, if the direction slider 72 is returned to the stopping position from the normal or reverse mode position, then the seesaw lever 50 is returned to the neutral position.

Referring now to FIGS. 3, 4, 8 to 10, 16, 17 and 20, a centering spring 81 having a pair of long arms 81b and 81c is disposed at a location of the mechanism chassis 2 opposing to a right end portion of the direction slider 72. A coil portion 81a of the centering spring 81 is supported on a spring supporting pin 82 mounted vertically downwardly on the lower face of the mechanism chassis 2.

A spring anchoring member 83 is secured to a location of the lower face of the mechanism chassis 2 spaced a little rearwardly of the spring supporting pin 82, and the arms 81b and 81c of the centering spring 81 are positioned such that intermediate portions thereof hold the spring anchoring member 83 from the opposite left and right sides and end portions thereof are positioned such that they hold the spring anchoring lug 79 formed on the direction slider 72 from the opposite left and right sides. When the direction slider 72 is at the stopping position, the two arms 81b and 81c of the centering spring 81 are resiliently contacted with the spring anchoring member 83 in a condition wherein they extend substantially linearly in the forward and rearward directions and are contacted lightly with the spring anchoring lug 79.

Accordingly, when the direction slider 72 is moved leftwardly from the stopping position, the spring anchoring lug 79 thereof presses the left-hand side arm 81b of the centering spring 81 to space the arm 81b away from the spring anchoring lug 83. In this condition, the resilient force of the left-hand side arm 81b acts as a force to resiliently press the spring anchoring lug 79 rightwardly. On the contrary, when the direction slider 72 is moved rightwardly farther than the stopping position, the spring anchoring lug 79 thereof presses the right-hand side arm 81c of the centering spring 81 to space the arm 81c away from the spring anchoring member 83. In this condition, the resilient force of the arm 81c acts as a force to resiliently press the spring anchoring lug 79 toward the left.

Thus, when the direction slider 72 is at any position other than the stopping position, the direction slider 72 is always acted upon by a force to move the same toward the stopping position.

Referring now to FIGS. 3 to 5, 7 to 11 and 15 to 21, the cam gear 84 is rotated in the clockwise direction as viewed from above. The cam gear 84 has a main portion 85 in the form of a disk which is supported at a central portion thereof for rotation at a lower portion of a left-hand side one of the two supporting pins 80 on which the direction slider 72 is supported. Further, the center of the main portion 85 of the cam gear 84 is positioned on an extension line of a lotus of movement of the control pin 77 of the direction slider 72.

Referring now to FIGS. 3 to 5, 7 to 11 and 15 to 21, the cam gear 84 has a pair of toothed portions 86 and 87 formed in a circumferential direction at a lower portion of an outer peripheral face 85a of the main portion 85 thereof with a pair of non-toothed portions 88 and 89 left between them. The small gear 18b (hereinafter referred to as "driving gear") of the transmission gear 18 is positioned such that the pitch circle thereof contacts substantially from outwardly forwardly with the pitch circle of the toothed portions 86 and 87 of the cam gear 84.

The toothed portion 86 (hereinafter referred to as "first toothed portion") of the cam gear 84 has an extent of 250 degrees or so in central angle while the other toothed portion 87 (hereinafter referred to as "second toothed portion") has an extent a little smaller than 40 degrees in central angle. When the cam gear 84 is at such a position as shown in FIGS. 3 and 10 and FIG. 15(A) (such position will be hereinafter referred to as "first locked position"), an end 86a (hereinafter referred to as "leading end portion") of the first toothed portion 86 in the clockwise direction is positioned, as viewed from above, a little displaced from a position just in front of the center of the cam gear 84 in the counterclockwise direction while a leading end portion of the second toothed portion 87, that is, a leading end 87a in the clockwise direction, is positioned displaced about 50 degrees in the counterclockwise direction from a position just leftwardly of the center of the cam gear 84. Accordingly, the non-toothed portion 88 (hereinafter referred to as "first non-toothed portion") of the cam gear 84 which is positioned between the leading end portion 86a of the first toothed portion 86 and the second toothed portion 87 has an extent substantially greater than 20 degrees in central angle while the other non-toothed portion 89 (hereinafter referred to as "second non-toothed portion") has an extent of about 50 degrees in central angle.

The cam gear 84 is lockable at the first locked position and a second locked position shown in FIGS. 8 and 9, respectively, by the trigger lever 104 which will be hereinafter described, and when the cam gear 84 is at the first locked position, the first non-toothed portion 88 is opposed to the driving gear 18b, but when the cam gear 84 is at the second locked position, a portion of the second non-toothed portion 89 adjacent a trailing end portion of the first toothed portion 86, that is, a trailing end 86b in the counterclockwise direction, is opposed to the driving gear 18b.

Thus, if initial triggering (which will be hereinafter described) of the cam gear 84 takes place when the cam gear 84 is at either one of the two locked positions, locking of the cam gear 84 is cancelled and the cam gear 84 is rotated a little in the clockwise direction by initial rotation.

Figure 18:
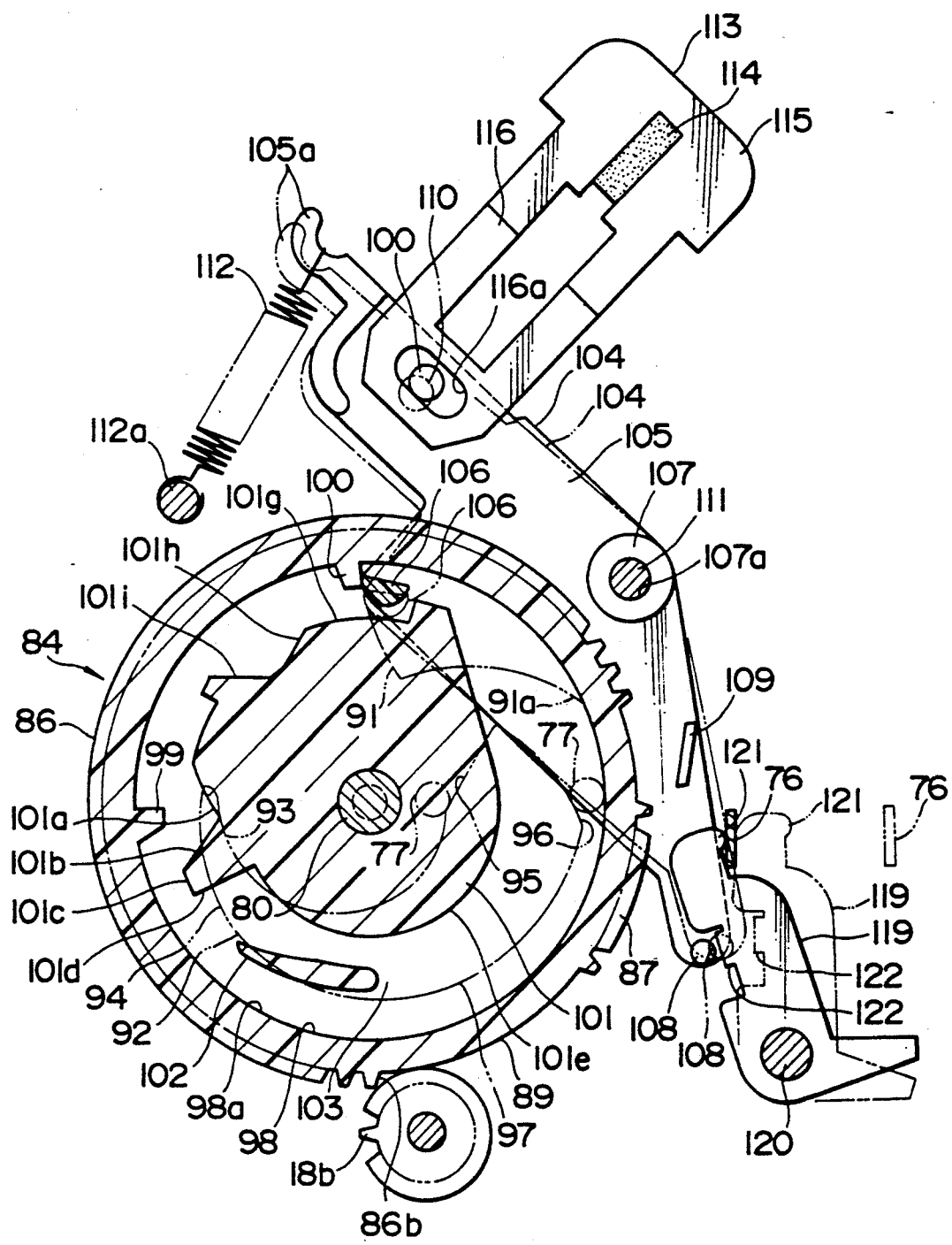
FIG. 18 is an enlarged horizontal sectional view of the mode changing over mechanism after establishment of a play mode.

Accordingly, if initial triggering takes place when the cam gear 84 is at the first locked position and the motor 10 rotates forwardly so that the driving gear 18b is rotated in the counterclockwise direction, then the leading end portion 86a of the first toothed portion 86 is brought into meshing engagement with the driving gear 18b as indicated by an alternate long and two short dashes line in FIG. 15(A) so that the first toothed portion 86 is thereafter fed by the driving gear 18b. Consequently, the cam gear 84 is rotated in the clockwise direction. Such rotation of the cam gear 84 comes to an end when the second non-toothed portion 89 is rotated to a-position in which it is opposed to the driving gear 18b as shown in FIG. 18, that is, when the cam gear 84 comes to the second locked position, and here, locking of the cam gear 84 is established.

Further, also movement of the cam gear 84 from the second locked position to the first locked position proceeds basically in a similar manner as described above, but rotation of the cam gear 84 until the leading end portion 87a of the second toothed portion 87 is brought into meshing engagement with the driving gear 18b is performed not by initial triggering but by the control pin 77 of the direction slider 72 which presses a cam portion 97, which will be hereinafter described, provided on the cam gear 84.

Such rotation of the cam gear 84 will be hereinafter described more in detail.

It is to be noted that the cam gear 84 is held at the first locked position when the tape player 1 is in an initial condition or in a stop mode; it is moved to the second locked position when a play mode is to be established; and it is normally returned to the first locked position when a stop mode is to be established.

Referring now to FIGS. 3, 4, 8 to 11 and 15 to 21, the cam gear 84 has a recessed portion 90 formed on an upper face of the main portion 85. The recessed portion 90 of the cam gear 84 has a circular shape having a diameter a little smaller than the diameter of the main portion 85. An inner periphery of the recessed portion 90 is bent substantially in an L shape at a portion 91 thereof, and a most portion 91a (hereinafter referred to as "last time guide portion") of the inner periphery portion 91 bent in an L shape extends such that it is displaced, in a condition wherein the cam gear 84 is at the first locked position, toward the rear along the clockwise direction from the position substantially on the front side of the center of the cam gear 84 while drawing a moderate arc and then approaches the center toward the rear end. Further, the rear end of the portion 91a is positioned substantially on the right-hand side of the center of the main portion 85 and at a location substantially midway between the outer peripheral face 85a and the center of the main portion 85. Meanwhile, the remaining portion 91b (hereinafter referred to as "stopping regulating face") of the circumferential face 91 bent in an L shape extends such that it draws a moderate arc from the rear end of the last time guide face 91a substantially toward the right.

A cam projection 92 is formed in the recessed portion 90 of the cam gear 84 such that it has an extent greater than 180 degrees in central angle and has a substantially comma shape which is thin at a leading end 92a in the clockwise direction but is thick at the other leading end in the counterclockwise direction. The cam projection 92 is positioned between the center and the inner periphery of the cam gear 84, and the leading end 92a thereof in the clockwise direction is positioned a little displaced toward the inner periphery of the cam gear from a central location between the center and the inner periphery of the cam gear 84 and besides is positioned substantially just behind the center of the cam gear 84 when the cam gear 84 is at the first locked position.

A side face of the cam projection 92 of such construction includes, from the point of view of a function, a normal mode pressing face 93, a reverse mode pressing face 94, and two first and second pressure receiving faces 95 and 96. In particular, the normal mode pressing face 93 is provided by about two thirds adjacent the end portion 92a of that portion of the side face of the cam projection 92 which is directed to the center of the cam gear 84. The normal mode pressing face 93 has an arcuate shape, and an end thereof remote from the end portion 92a of the cam projection 92 is located near the center of the cam gear 84. Accordingly, the normal mode pressing face 93 is formed such that the distance thereof from the center of the cam gear 84 decreases toward the counterclockwise direction. Meanwhile, the reverse mode pressing face 94 is provided by most of that portion of the side face of the cam projection 92 which is directed on the opposite side to the center of the cam gear 84. The reverse mode pressing face 94 has an arcuate shape more moderate than the normal mode pressing face 93 and is formed such that the distance thereof from the center of the cam gear 84 increases toward the counterclockwise direction. The first pressure receiving face 95 is provided by a portion of the side face of the cam projection 92 contiguous to the leading end of the normal mode pressing face 93 in the counterclockwise direction. The first pressure receiving face 95 is formed as a flat face and directed substantially to the left rear when the cam gear 84 is at the second locked position. The second pressure receiving face 96 is provided by a portion of the side face of the cam projection 92 positioned between the first pressure receiving face 95 and the reverse mode pressing face 94. The second pressure receiving face 96 is formed as a very moderate curved face and directed substantially to the right rear when the cam gear 84 is at the second locked position.

A cam section 97 (hereinafter referred to as "first cam section") for performing position control of the direction slider 72 is constructed from the last time guide face 91a, stopping regulating face 91b, normal mode pressing face 93, reverse mode pressing face 94 and first and second pressure receiving faces 95 and 96 described above.

A lower portion of the control pin 77 of the direction slider 72 is positioned in the recessed portion 90 on the right-hand side of the center of the cam gear 84.

Referring now to FIGS. 5, 15, 18, 19 and 21, another recessed portion 98 is formed on a lower face of the main portion 85 and has a generally circular shape having a diameter a little smaller than the diameter of the main portion 85. A pair of small locking projections 99 and 100 each having a trapezoidal shape are formed radially inwardly on an inner peripheral face 98a of the recessed portion 98, and the locking projection 99 (hereinafter referred to as "first locking projection") is disposed at a location substantially just behind the center of the cam gear 84 when the cam gear 84 is at the first locked position while the other locking projection 100 (hereinafter referred to as "second locking projection") is disposed at a location substantially just behind the center of the cam gear 84 when the cam gear 84 is at the second locked position.

A comparatively great cam projection 101 is formed in a region in the recessed portion 98 which includes the center of the cam gear 84, and a side face thereof has the following various portions.

In particular, a portion of the side face of the cam projection 101 which is opposed to the first locking projection 99 as viewed from above when the cam gear 84 is at the first locked position has a pair of inclined faces 101a (hereinafter referred to as "initial pressure receiving face") and 101b (hereinafter referred to as "initial pushing back face") which are opened in such a manner that they may make a substantially V shape relative to each other toward the first locking projection 99, and an end portion 101c of the initial pushing back face 101b remote from the initial pressure receiving face 101a extends substantially in parallel to the inner peripheral face 98a of the recessed portion 98. A portion 101d contiguous in the counterclockwise direction to the end portion 101c extends substantially radially toward the center of the cam gear 84, and another portion 101e (hereinafter referred to as "non-displacing face") contiguous to the portion 101d and extending over a range of about 160 degrees or so in central angle is located substantially midway between the center of the cam gear 84 and the inner peripheral face 98a of the recessed portion 98 and is formed as an arcuate face such that the distance thereof from the center of the cam gear 84 is fixed. Further, a portion 101f (hereinafter referred to as "displacing face") ahead of the non-displacing face 101e is formed as a flat face which extends such that it approaches near the inner peripheral face 98a of the recessed portion 98 toward the counterclockwise direction. A comparatively short portion ahead of the displacing face 101f first extends substantially in parallel to the inner peripheral face 98a and then extends toward the center of the cam gear 84 such that it makes a step, and a portion 101g (hereinafter referred to as "holding face") ahead of the portion is at a location opposed to the second locking projection 100 and extends substantially in parallel to the inner peripheral face 98a. A portion ahead of the holding face 101g includes a last time pressure receiving face 101h and a last time pushing back face 101i which are directed in the opposite directions to the center of the cam gear 84 and are opened relative to each other such that they may make a substantially V shape. A comparatively short portion between the last time pushing back face 101i and the initial pressure receiving face 101a is formed such that most part thereof makes an arcuate face the distance of which from the cam gear 84 is fixed.

Another cam projection 102 (hereinafter referred to as "reverse mode pressing cam") is formed in the recessed portion 98 of cam gear 84. The cam projection 102 is comparatively thin and has an extent of about 45 degrees or so in central angle drawing a moderate arc. The cam projection 102 is disposed at or near a central location between a portion of the non-displacing face 101e adjacent the cam face portion 101d of the cam projection 101 and the inner peripheral face 98a such that it extends substantially in parallel to the inner peripheral face 98a. Some gap is provided between a leading end of the reverse mode pressing cam 102 in the clockwise direction and the cam face portion 101d as viewed from the center of the cam gear 84.

A second cam section 103 for performing position control of the trigger lever 104, which will be hereinafter described, is constructed from the two cam projections 101 and 102.

Referring now to FIGS. 3, 4, 8 to 11, 16, 17 and 20, an upper portion of the outer periphery 85a of the main portion 85 of the cam gear 84 serves a cam section for controlling the position of the limiting slider 65. In particular, a recess 85b is formed at a portion of the outer periphery 85a (hereinafter referred to as "controlling cam face"). The recess 85b is positioned substantially on the right-hand side of the center of the cam gear 84 when the cam gear 84 is at the first locked position.

A left end 65c of the limiting slider 65 is positioned substantially on the right-hand side of the center of the cam gear 84 and opposed to the controlling cam face 85a.

Accordingly, since the limiting slider 65 is normally biased leftwardly by the tension spring 70, when the cam gear 84 is at the first locked position, the left end 65c of the limiting slider 65 is received in the recess 85b of the cam gear 84 as shown in FIGS. 3 and 11, and in this condition, the limiting slider 65 is held at the non-limiting position. On the other hand, when the cam gear 84 is rotated in this condition, the left end 65c of the limiting slider 65 is contacted with some other portion of the controlling cam face 85a of the cam gear 84 than the recess 85b, whereupon the limiting slider 65 is moved rightwardly to the limiting position.

Referring to FIGS. 3, 4, 7 to 10 and 15 to 21, the trigger lever 104 has a main portion 105 in the form of a flat plate bent substantially in an L shape. A portion of the main portion 105 of the trigger lever 104 except the opposite end portions has a somewhat great width, and an engaging projection 106 having a semicircular shape as viewed from above is provided uprightly at a left end portion of the great width portion of the trigger lever 104 while a cylindrical hub 107 is formed at the center of a right-hand side portion of the great width portion. A rear end portion 105a of the main portion 105 of the trigger lever 104 is formed a little higher than the remaining portion and serves as a spring anchoring portion.

On an upper face of the main portion 105 of the trigger lever 104, a cylindrical pressing pin 108 is mounted at a front end portion; a low pressing wall 109 in the form of a lug is formed at a portion displaced a little forwardly from the hub 107; and a connecting pin 110 is mounted at a location adjacent the spring anchoring portion 105a.

A support shaft 111 is secured to a location of the lower face of the mechanism chassis 2 rightwardly rearwards adjacent the cam gear 84 and is fitted in a support hole 107a perforated in and extending through the hub 107. Consequently, the trigger lever 104 is supported for pivotal motion in a horizontal plane on the support shaft 111.

An upper portion of the engaging projection 106 of the trigger lever 104 is fitted in the recessed portion 98 formed on the lower face of the cam gear 84 substantially just behind the center of the cam gear 84.

A tension spring 112 has an end anchored at a spring anchoring pin 112a mounted on the mechanism chassis 2 and the other end anchored at the spring anchoring portion 105a of the trigger lever 104 and normally urges the trigger lever 104 in the counterclockwise direction as viewed from above.

The solenoid plunger 113 of the self holding type is secured to the lower face of the mechanism chassis 2. The solenoid plunger 113 includes a magnet 14 and a yoke 115 to which the magnet 114 is secured, a movable iron core 116 slidably movable in a direction in which it is engaged with or disengaged from the yoke 115, and a pair of coils 117. The movable iron core 116 is supported for sliding movement on a pair of bobbins 118 on which the coils 117 are wound. A connecting hole 116a is perforated at an end portion of the movable iron core 116 remote from the yoke 115, and the connecting pin 110 of the trigger lever 104 is fitted in the connecting hole 116a with a little gap left therebetween so that the trigger lever 104 and the movable iron core 116 are connected to each other.

When the movable iron core 116 is attracted to the yoke 115, the position of the trigger lever 104 is controlled against the tensile force of the tension spring 112, and in this condition, the trigger lever 104 is held at an arresting position wherein the engaging projection 106 thereon is positioned on a locus of the two locking projections 99 and 100 of the second cam portion 103 of the cam gear 84 upon rotation. However, when the coils 117 of the solenoid plunger 113 are energized in this condition, the force of the yoke 115 to attract the movable iron core 116 is offset by a magnetic force produced from the coils 117, and consequently, the trigger lever 104 is allowed to be pivoted in the counterclockwise direction by the tensile force of the tension spring 112.

It is to be noted that the pressing wall 109 of the trigger lever 104 is opposed to the pressure receiving projection 66 formed o the limiting slider 65, and when the cam gear 84 is at the first locked position, the pressing wall 109 of the trigger lever 104 and the pressure receiving projection 66 of the limiting slider 65 are contacted lightly with or located very closely to each other (refer to FIG. 3).

Referring to FIGS. 3, 4, 7 to 10 and 15 to 21, an intermediate lever 119 is provided which is pressed, when a reverse play mode is to be established, by the trigger lever 104 to move the direction slider 72 rightwardly a little.

The intermediate lever 119 is in the form of a comparatively small plate elongated in the forward and rearward direction and is bent substantially like a crank as viewed in the leftward or rightward direction. A front end portion of the intermediate lever 119 is supported for pivotal motion in a horizontal plane on a support shaft 120 mounted on the lower face of the mechanism chassis 2.

A rear end portion 121 of a right-hand side edge of the intermediate lever 119 has an arcuate shape which is swollen toward the right. The rear end portion 121 (hereinafter referred to as "pressing portion") of the intermediate lever 119 is positioned leftwardly of and opposed to the pressure receiving lug 76 formed on the direction slider 72.

Meanwhile, a pressure receiving lug 122 is formed vertically downwardly substantially at the center of a left-hand side edge of the intermediate lever 119 and is located on a locus of the pressing pin 108 of the trigger lever 104 upon pivotal motion and is disposed substantially rightwardly of and opposed to the pressing pin 108.

It is to be noted that, when the trigger lever 104 is at its arresting position in which it is attracted to the solenoid plunger 113 and besides the direction slider 72 is at the stopping position, the intermediate lever 119 is positioned between the pressing pin 108 of the trigger lever 104 and the pressure receiving lug 76 of the direction slider 72 with some gap left therebetween.

Thus, if the trigger lever 104 is pivoted in the counterclockwise direction so that the pressing pin 108 thereon presses the pressure receiving lug 122 of the intermediate lever 119 rightwardly, then the intermediate lever 119 is pivoted in the clockwise direction so that the pressing portion 121 thereon presses the pressure receiving lug 76 of the direction slider 72 rightwardly, and consequently, the direction slider 72 is moved rightwardly. The amount of such movement corresponds to an amount of pivotal motion of the trigger lever 104 in the counterclockwise direction.

Figure 14:
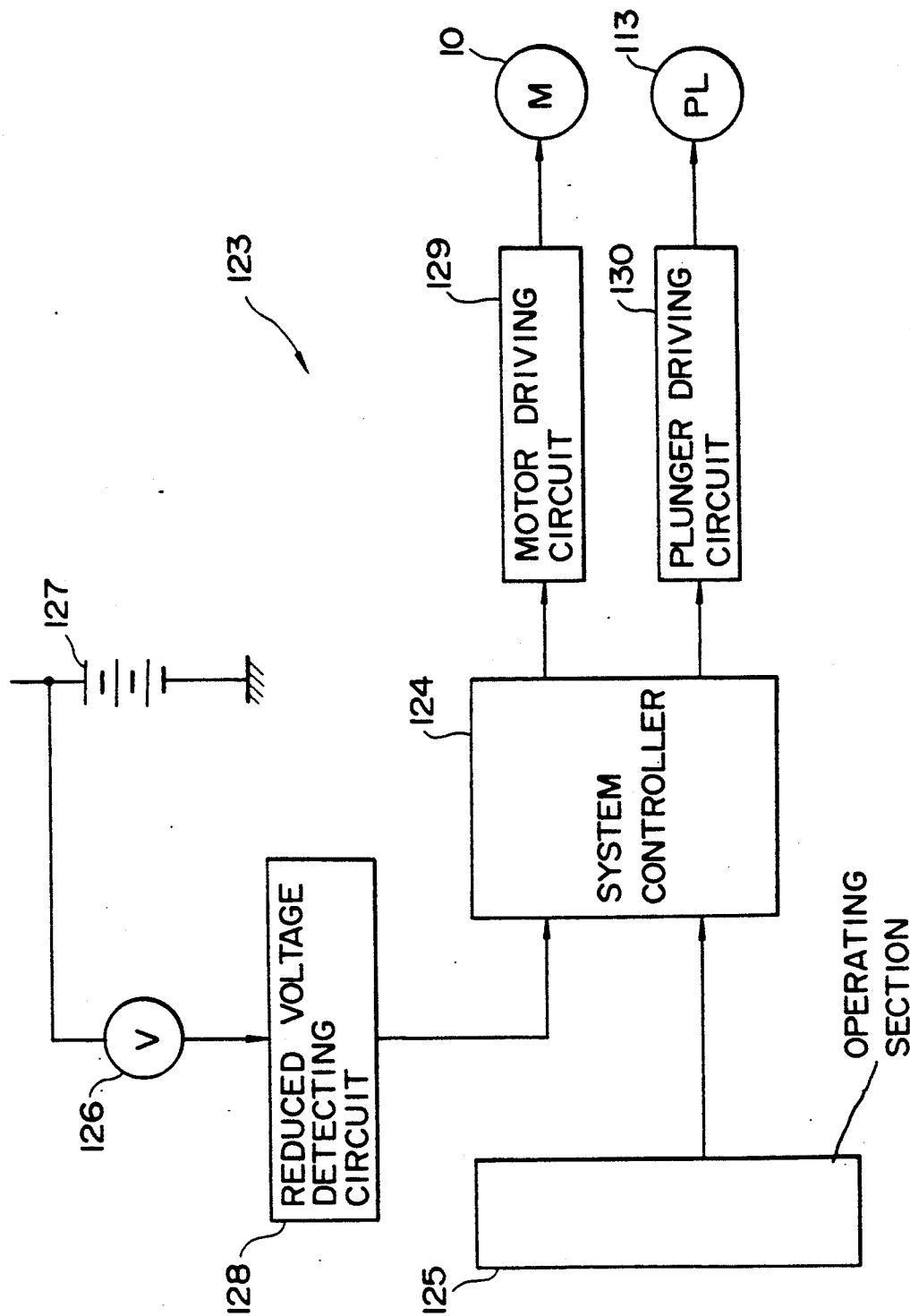
FIG. 14 is a block diagram of a controlling circuit of the mode changing over mechanism.

Referring now to FIG. 14, there is shown essential part of a control circuit of the tape player 1. The control circuit shown includes a system controller 124 which includes a microcomputer not shown and outputs, when various signals are inputted thereto, predetermined instruction signals to individual driving circuits and so forth in accordance with a predetermined program.

The control circuit further includes an operating section 125 which includes various operating switches for mode selection and so forth and is connected to an input section of the system controller 124. The control circuit further includes a voltage measuring element 126 for measuring a voltage of a battery power source 127 and a reduced voltage detecting circuit 128. The reduced voltage detecting circuit 128 develops a predetermined signal (hereinafter referred to as "limit signal") to the system controller 124 when a voltage of the battery power source 127 detected by the voltage detecting element 126 is lower than a predetermined level. The control circuit further includes a motor driving circuit 129 and a plunger driving circuit 130.

When an instruction signal to select a play mode or a stop mode is transmitted from the operating section 125 to the system controller 124, an instruction signal to temporarily energize the solenoid plunger 113 is delivered from the system controller 124 to the plunger driving circuit 130 while another instruction signal to cause the motor 10 to rotate forwardly is delivered to the motor driving circuit 129. When the signal inputted to the system controller 124 instructs selection of a normal play mode or a stop mode, energization of the solenoid plunger 113 takes place only once, but when the input signal instructs selection of a reverse play mode, such energization takes place twice at a predetermined interval of time. On the other hand, when a signal to select a high speed feeding mode is inputted to the system controller 124, an instruction signal to cause the motor 10 to rotate reversely is delivered from the system controller 124 to the motor driving circuit 129, but when another instruction signal to select a rewinding mode is inputted, an instruction signal to cause the motor 10 to rotate forwardly is delivered from the system controller 124 to the motor driving circuit 129.

On the other hand, when a limit signal mentioned hereinabove is inputted from the reduced voltage detecting circuit 128 to the system controller 124, an instruction signal to energize the solenoid plunger 113 is delivered from the system controller 124 to the plunger driving circuit 130.

It is to be noted that the voltage of the battery power source 127 when a limit signal is to be developed is set to a value a little higher than a lowest voltage necessary to cause the solenoid plunger 113 to generate an effective repulsive magnetic force.

Selective establishment of one of the modes described above is performed in the following manner. Referring first to FIGS. 1 and 3, when the tape player 1 is in an initial condition, the trigger lever 104 is at the arresting position in which it is attracted to the solenoid plunger 113, and the cam gear 84 is at the first locked position in which the first locking projection 99 is abutted in the clockwise direction with the engaging projection 106 of the trigger lever 104 and the stopping regulating face 91b of the first cam section 97 thereof is positioned substantially on the right-hand side of the center of the cam gear 84 such that it contacts from forwardly with the locus of movement of the control pin 77 of the direction slider 72 while the control pin 77 contacts lightly with a substantially mid portion of the stopping regulating face 91b.

Accordingly, in this condition, pressing of the control pin 77 by the first cam section 97 in the leftward or rightward direction is not performed, and consequently, the direction slider 72 is held at the stopping position by the centering spring 81. Consequently, the seesaw lever 50 and the oscillating lever 56 for a low speed are held at the respective neutral positions.

Thus, the cam gear 84 is locked at the first locked position since the first locking projection 99 thereof is abutted in the clockwise direction with the engaging projection 106 of the trigger lever 104 and the control pin 77 is contacted in the counterclockwise direction with the stopping regulating face 91b thereof.

Further, when the tape player 1 is in such initial condition as described above, the head base 24 is held at the ejection position under the biasing force of the returning spring 32, and the limiting slider 65 is held at the non-limiting position under the biasing force of the tension spring 70.

When the tape player 1 is in a stop mode, the condition thereof is similar to that when it is in such initial condition except that the head base 24 is at the stopping position. In particular, also when the tape player 1 is in a stop mode, the cam gear 84 is locked at the first locked position while the direction slider 72 is held at the stopping position; the seesaw lever 50 at the neutral position; the oscillating lever 56 for a low speed at the neutral position; and the limiting slider 65 at the non-limiting position; but only the head base 24 is positioned at the stopping position as different from that in the initial condition.

It is to be noted that, in this condition, the control pin 77 of the direction slider 72 is positioned a little displaced to the inner side from a locus of movement of the end portion 92a of the cam projection 92 of the first cam section 97 of the cam gear 84 upon rotation.

Referring now to FIG. 11, if an instruction signal to select a high speed feeding mode is inputted to the system controller 124 when the tape player 1 is in a stop mode, then the motor 10 is caused to rotate reversely while energization of ht solenoid plunger 113 does not take place. Consequently, the oscillating lever 59 for a high speed is pivoted in the counterclockwise direction to bring the take-up side oscillating gear 60 for a high speed into meshing engagement with the gear portion 7 of the take-up side reel base 5. Consequently, the take-up side reel base 5 is rotated at a high speed in the tape winding direction, and the magnetic tape 43 is fed at a high speed in the normal mode direction.

On the other hand, when another instruction signal to select a rewinding mode is inputted to the system controller 124 while the tape player 1 is in a stop mode, the motor 10 is caused to rotate forwardly while energization of the solenoid plunger 113 does not take place. Consequently, the oscillating lever 59 for a high speed is pivoted in the clockwise direction to bring the supply side oscillating gear 61 for a high speed into meshing engagement with the gear portion 7' of the supply side reel base 5'. Consequently, the supply side reel base 5' is rotated at a high speed in the tape rewinding direction, and the magnetic tape 43 is fed at high speed in the reverse mode direction.

Figure 15B:
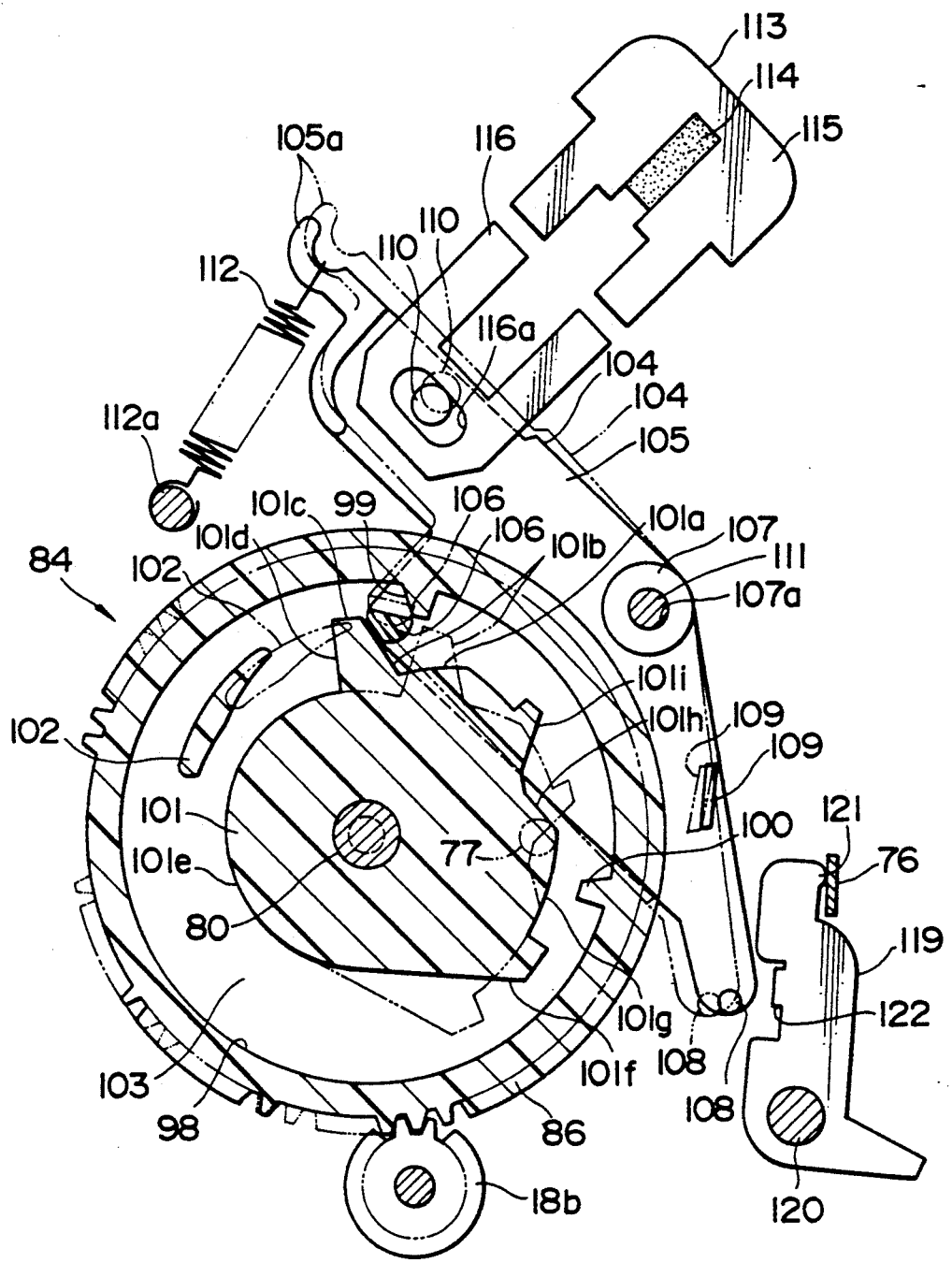
Figure 16:
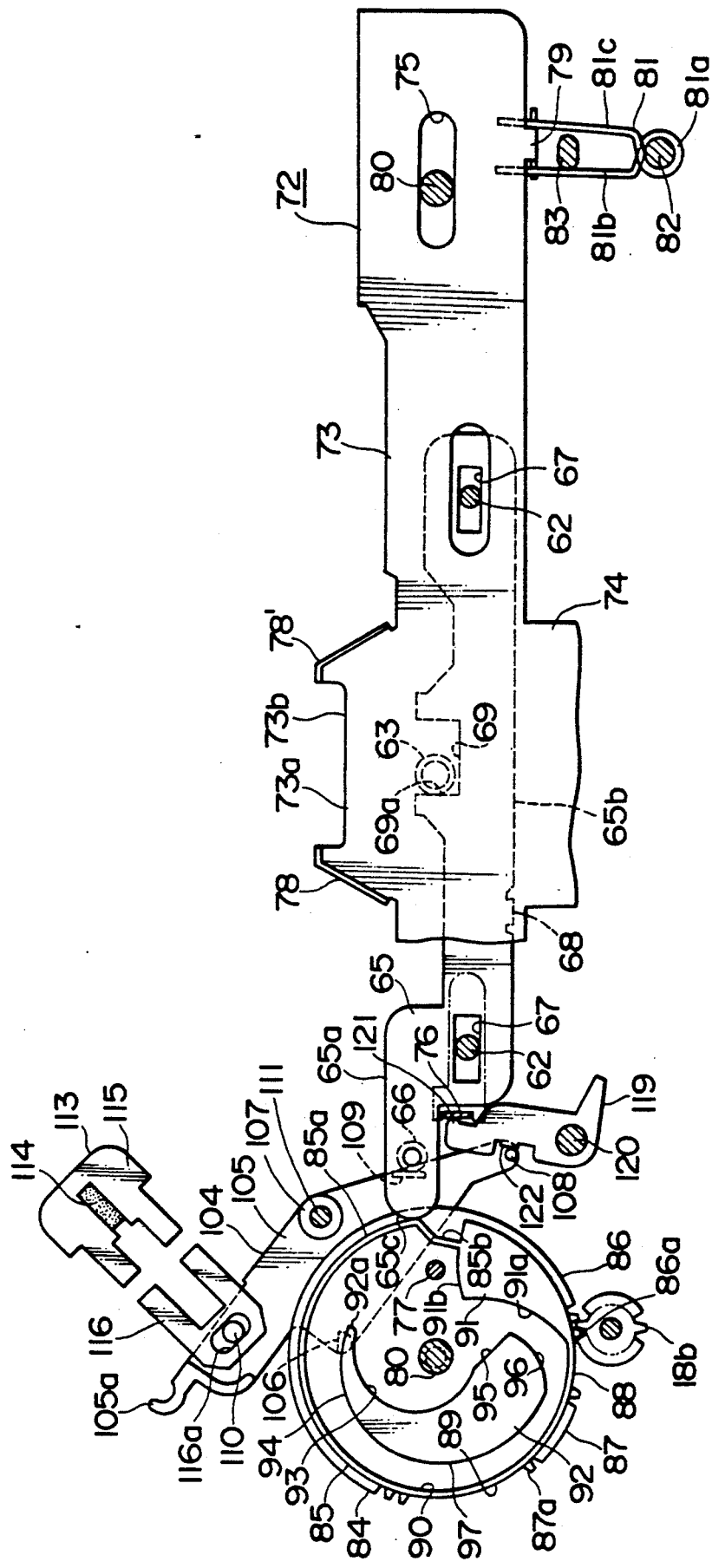
FIG. 16 is a top plan view showing a direction slider of the mode changing over mechanism upon initial triggering.

Referring now to FIGS. 15 and 16, if an instruction signal to select a play mode is inputted to the system controller 124 when the tape player 1 is in an initial condition or in stop mode, then temporary energization of the solenoid plunger 113 takes place while the motor 10 is caused to rotate forwardly. By such energization (hereinafter referred to as "initial energization") of the solenoid plunger 113 then, initial triggering of the cam gear 84, that is, cancellation of locking of the cam gear 84 at the first locked position which has continued till then and initial rotation of the cam gear are performed.

In particular, when energization of the solenoid plunger 113 takes place, attraction of the trigger lever 104 to the solenoid plunger 113 is cancelled and the trigger lever 104 is rotated in the counterclockwise direction. Consequently, the engaging projection 106 of the trigger lever 104 is disengaged substantially forwardly from the first locking projection 99 of the cam gear 84 as indicated by an alternate long and two short dashes line in FIG. 15(A). Consequently, locking which has been done for the cam gear 84 is cancelled to put the cam gear 84 into a condition wherein it can rotate. Thereupon, the engaging projection 106 of the trigger lever 104 which is moved substantially forwardly is abutted with the initial pressure receiving face 101a of the second cam portion 103 and presses the same forwardly rather to the right-hand side. Such pressing operation continues until the engaging projection 106 is abutted with a ravine bottom-like portion of the cam projection 101 at which the initial pressure receiving face 101a and the initial pushing back face 101b contiguous to the initial pressure receiving face 101a connect to each other as indicated by an alternate long and two short dashes line in FIG. 15(A). The position of the trigger lever 104 then will be hereinafter referred to as "non-arresting position". The cam gear 84 is rotated a little in the clockwise direction by such pressing. Such rotation of the cam gear 84 is initial rotation, and as a result of such initial rotation, the leading end portion 86a of the first toothed portion 86 of the cam gear 84 is brought into meshing engagement with the driving gear 18b. Consequently, the driving gear 18b thereafter feeds the first toothed portion 86 of the cam gear 84 to rotate the cam gear 84 toward the second locked position.

Then, when such rotation of the cam gear 84 by the driving gear 18b proceeds, the initial pushing back face 101b of the cam projection 101 of the cam gear 84 presses the engaging projection 106 of the trigger lever 104 substantially to the right rear as indicated by a solid line in FIG. 15(B). Consequently, the trigger lever 104 is pivoted in the clockwise direction. Then, substantially simultaneously when the engaging projection 106 of the trigger lever 104 rides over to the end portion 101c of the initial pushing back face 101b of the cam projection 101, the trigger lever 104 comes to the arresting position and is attracted to and held by the solenoid plunger 113.

In short, the trigger lever 104 is moved once to the non-arresting position by a trigger provided by initial energization of the solenoid plunger 113 and is returned to the arresting position immediately after then.

Then, at a point of time when the end portion 101c of the initial pushing back face 101b of the cam projection 101 is displaced in the clockwise direction from the engaging projection 106 of the trigger lever 104, a portion of the cam projection between the cam portion 101d of the second cam projection 103 and the reverse mode pressing cam 102 is opposed to the engaging projection 106 as indicated by an alternate long and two short dashes line in FIG. 15(B).

It is to be noted that, when the trigger lever 104 is moved to the non-arresting position by initial triggering, the pressing pin 108 thereon presses the pressing lug 122 of the intermediate lever 119 to pivot the intermediate lever 119 a little in the clockwise direction, and consequently, the pressing portion 121 of the intermediate lever 119 presses the pressure receiving lug 76 of the direction slider 72 toward the right to move the direction slider 72 a little to the reverse mode position side as shown in FIG. 16. Then, when the trigger lever 104 is returned to the arresting position, pressing of the trigger lever 104 against the intermediate lever 119 is cancelled. Consequently, the direction slider 72 is allowed to be returned to the stopping position by the biasing force of the centering spring 81.

Figure 6:
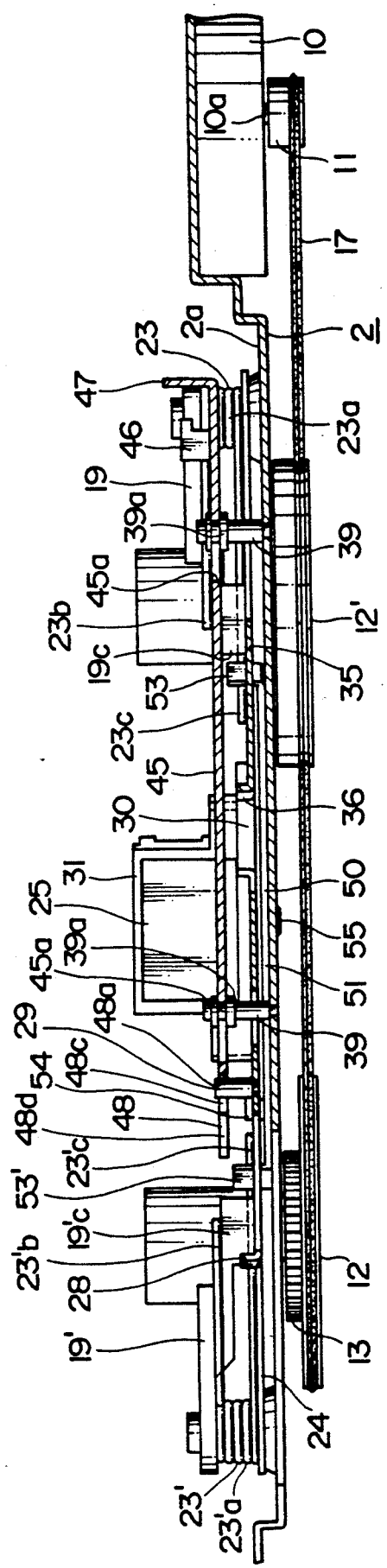
FIG. 6 is an enlarged sectional view taken along line VI—VI of FIG. 1.
Figure 7:
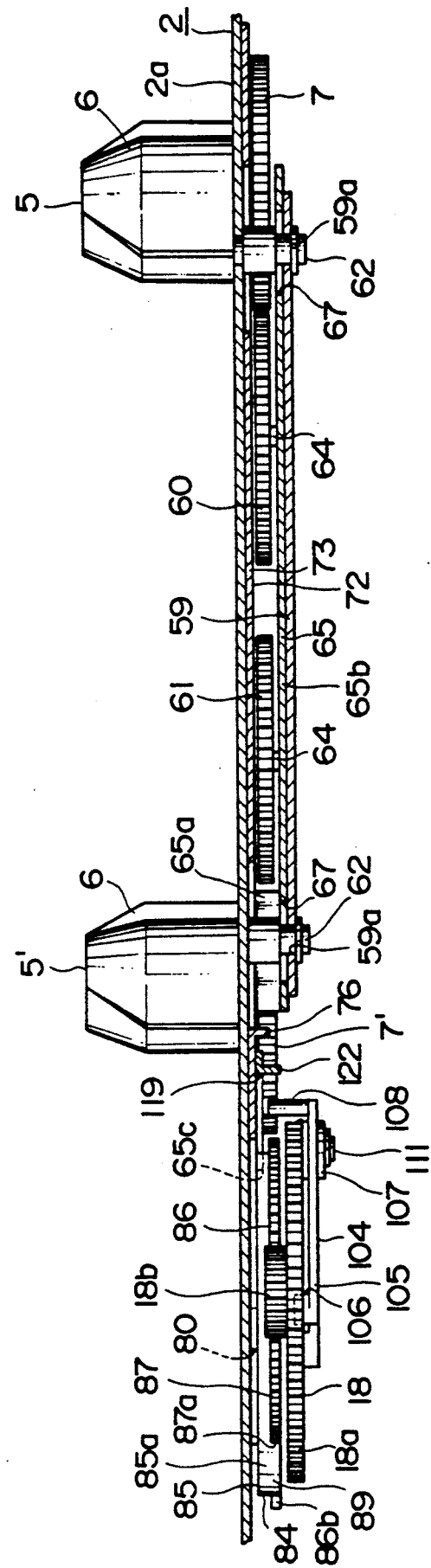
FIG. 7 is an enlarged sectional view taken along line VII—VII of FIG. 3.

Further, when the trigger lever 104 is moved to the non-arresting position, the pressing wall 109 thereof presses the pressure receiving projection 66 of the limiting slider 65 toward the right to move the limiting slider 65 to the limiting position (refer to FIG. 6). Consequently, pivotal motion of the oscillating lever 59 for a high speed in the clockwise direction is limited and the supply side oscillating gear 61 for a high speed is prevented from being meshed with the gear portion 7' of the supply side reel base 5,.

Figure 17:
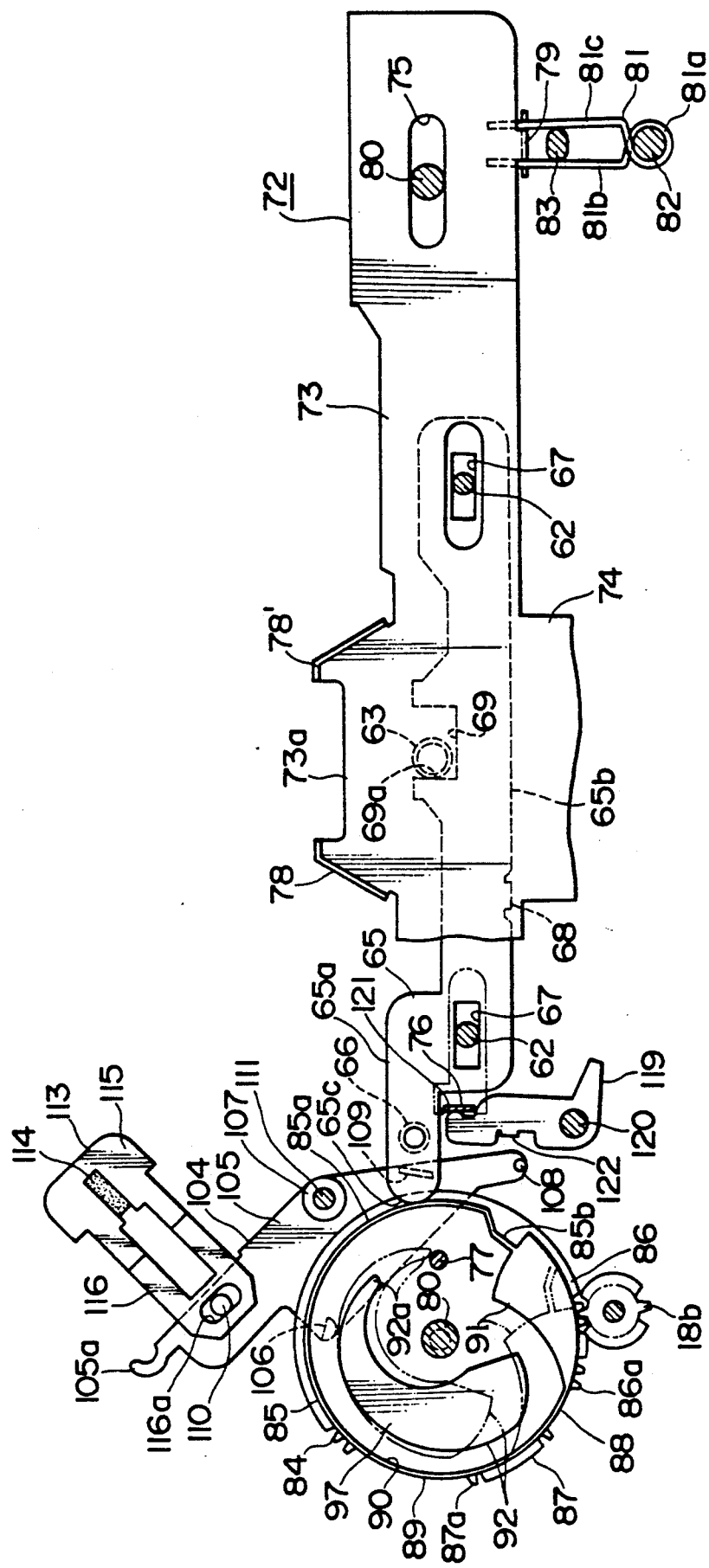
FIG. 17 is a top plan view of the mode changing over mechanism during establishment of a normal play mode.

Referring now to FIGS. 8, 17 and 18, in case the instruction to form a play mode instructs selection of a normal play mode, energization of the solenoid plunger 113 is performed only for the initial energization described above. Accordingly, in this instance, the normal mode pressing face 93 of the first cam section 97 of the cam gear 84 is contacted with the control pin 77 of the direction slider 72 to press the control pin 77 toward the left thereby to move the direction slider 72 to the normal mode position.

In particular, in this instance, since the cam gear 84 is rotated toward the second locked position while the direction slider 72 is at the stopping position and the control pin 77 thereof remains positioned on the inner side of the locus of rotation of the end portion 92a of the cam projection 92, when the cam gear 84 is rotated by about 90 degrees from the first locked position, the end portion 92a of the cam projection 92 is abutted substantially from the right rear with the control pin 77 as indicated by an alternate long and two short dashes line in FIG. 17. After then, the normal mode pressing face 93 of the cam projection 92 is contacted with and presses the control pin 77 toward the left, and consequently, the direction slider 72 is moved from the stopping position toward the norma mode position. Such pressing of the normal mode pressing face 93 against the control pin 77 to the left comes to an end when the leading end of the normal mode pressing face 93 in the counterclockwise direction is contacted with the control pin 77, and thereupon, the direction slider 72 comes to a position displaced a little leftwardly from the normal mode position. Immediately after then, the cam gear 84 comes to the second locked position and is abutted with the engaging projection 106 of the trigger lever 104 which is at the arresting position. Further, in a short period of time then, the control pin 77 is abutted with and returned rightwardly a little by an end portion of the first pressure receiving face 95 of the cam projection 92 adjacent the normal mode pressing face 93 as shown in FIG. 8 and also indicated by an alternate long and two short dashes line in FIG. 18, and consequently, the direction slider 72 is returned to the normal mode position.

Accordingly, when the cam gear 84 is at the second locked position, rotation of the cam gear 84 is inhibited and the control pin 77 is prevented from moving rightwardly because it is abutted from leftwardly with the first pressure receiving face 95 of the cam projection 92 which is directed substantially to the left rear, and consequently, the direction slider 72 is held at the normal mode position against the biasing force of the centering spring 81.

Since the direction slider 72 is moved to the normal mode position and held there in this manner, the seesaw lever 50 is pivoted in the counterclockwise direction to move the head base 24 to the playing position by way of the sub lever 35 and move the normal mode side pinch roller lever 19 to the advanced position so that the pinch roller 20 is resiliently pressed against the normal mode side capstan 9 while the oscillating lever 56 for a low speed is pivoted in the clockwise direction so that the oscillating gear 57 for a low speed thereon is brought into meshing engagement with the take-up side input gear 8.

A normal play mode is established in this manner.

Referring now to FIGS. 9. 15 and 18 to 20, in case the instruction to form a play mode instructs selection of a reverse play mode, energization of the solenoid plunger 113 is performed once more again after a predetermined interval of time after the initial energization described above is performed.

In particular, when a reverse play mode is selected, rotation of the cam gear 84 by the driving gear 18b is started by such initial triggering as described hereinabove, and besides, after the trigger lever 104 is returned to the arresting position, energization of the solenoid plunger 113 is performed once more again when the cam gear 84 comes to a position indicated by an alternate long and two short dashes line in FIG. 15(B). Consequently, the trigger lever 104 is pivoted in the counterclockwise direction, and the engaging projection 106 thereof passes between the cam portion 101d of the second cam portion 103 and the reverse mode pressing cam 102 and comes to a position near an end portion of the non-displacing face 101e adjacent the cam portion 101d and then positioned at a location on the inner side of the lotus of rotation at the end of the reverse mode pressing cam 102 in the clockwise direction, that is, at a location displaced toward the center of the cam gear 84.

Figure 20A:
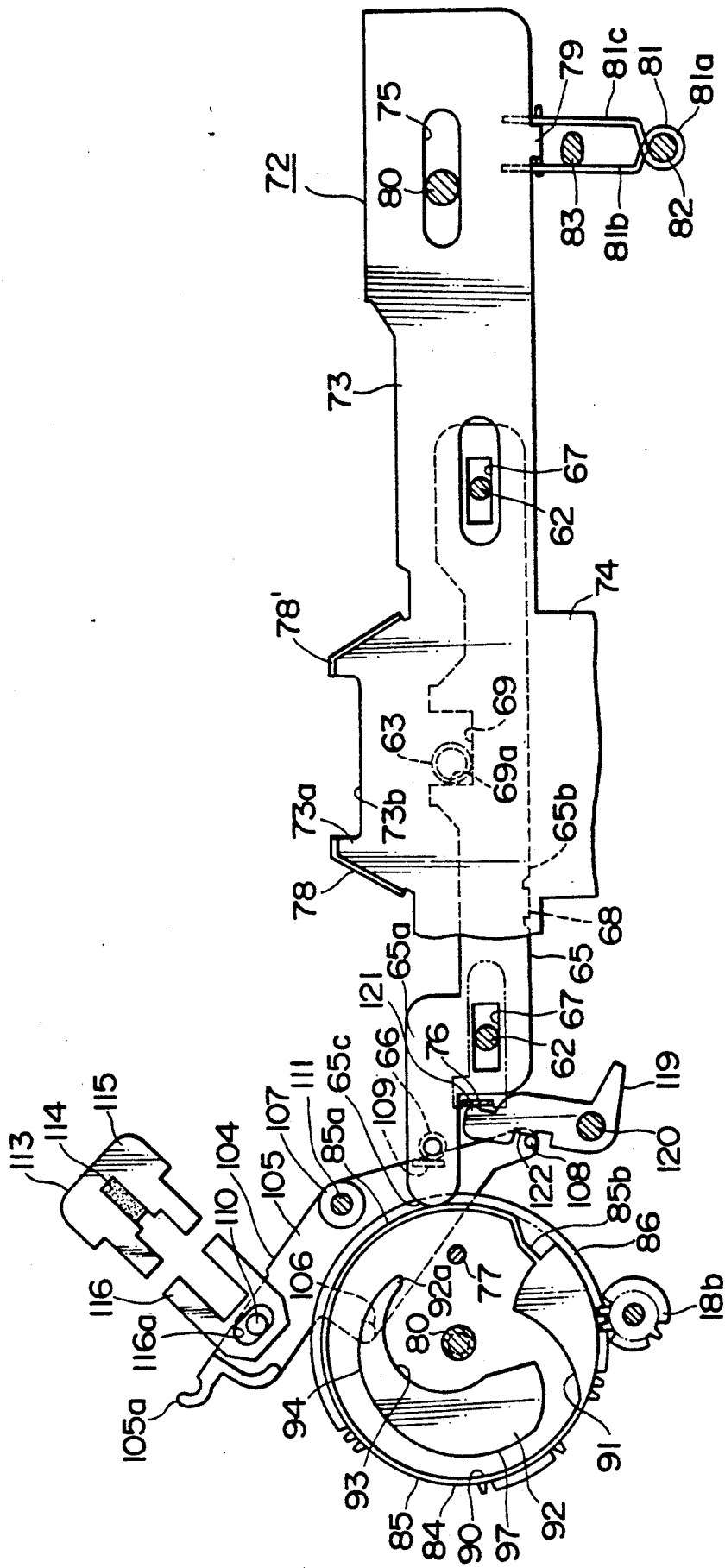
FIGS. 20(A) and 20(B) are plan views of the mode changing over mechanism at different positions during establishment of a reverse play mode.

It is to be noted that the position of the trigger lever 104 then is defined by a balance between the tensile force of the tension spring 112 and a reactive force to the pressing force with which the trigger lever 104 presses the direction slider 72 rightwardly by way of the intermediate lever 119, that is, the biasing force of the centering spring 81 then, and in the present tape player 1, when the trigger lever 104 comes to a position substantially same as the nonarresting position, the tensile force and the biasing force are balanced with each other so that the trigger lever 104 is held at the abutting position. FIG. 20(A) shows such condition of the tape player 1.

In this condition, the direction slider 72 is pressed to move rightwardly a little by the trigger lever 104 so that the control pin 77 thereof is moved a little outwardly of the locus of the end portion 92a of the cam projection 92 upon rotation of the cam gear 84, that is, in a direction away from the center of the cam gear 84. Then, the reverse mode pressing face 94 of the cam portion 92 presses the control pin 77 rightwardly to move the direction slider 72 to the reverse mode position.

Figure 19A:
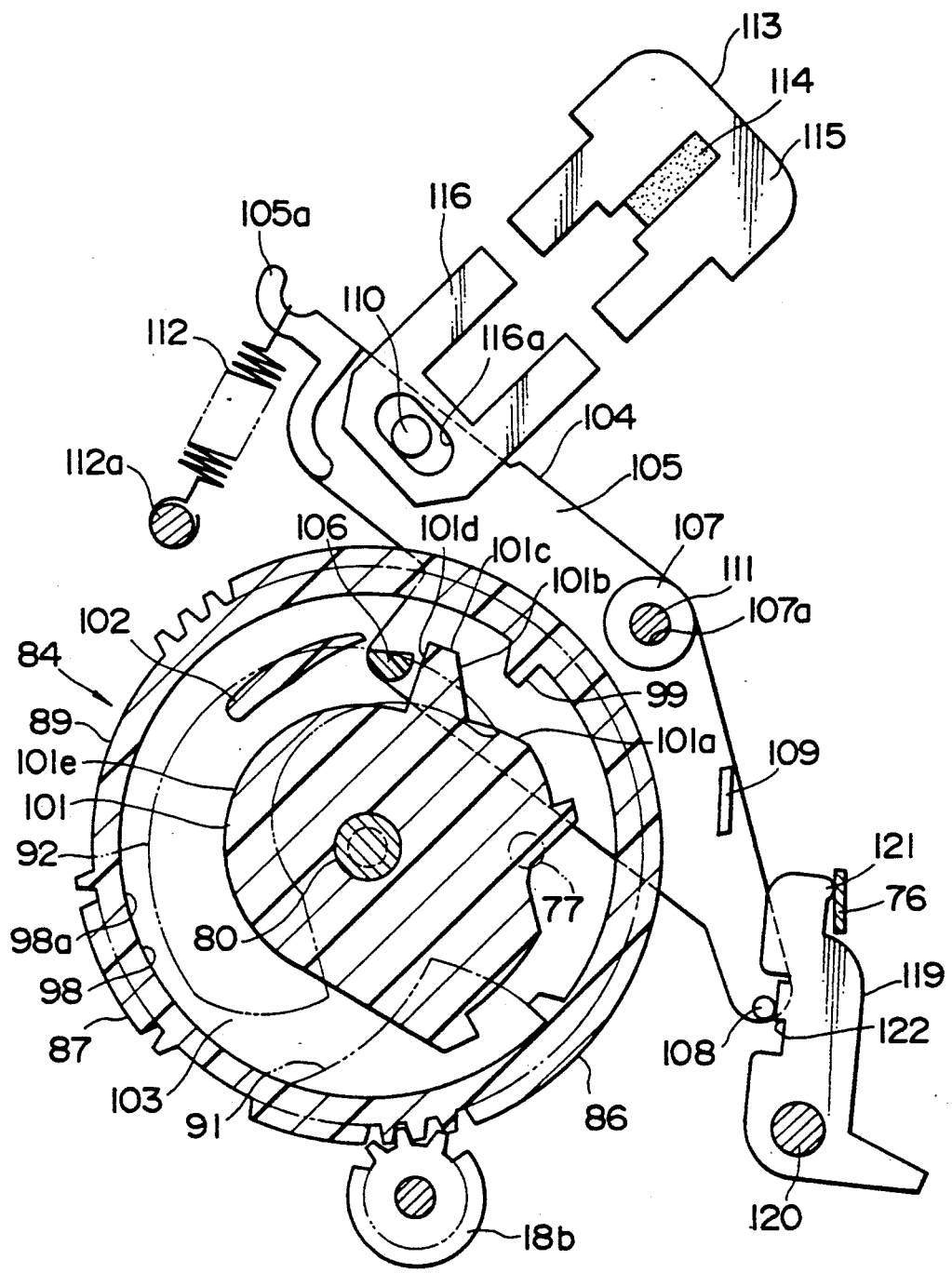
FIGS. 19(A), 19(B) and 19(C) are enlarged horizontal sectional views showing the cam gear and a trigger lever at different positions during establishment of a reverse play mode.
Figure 19B:
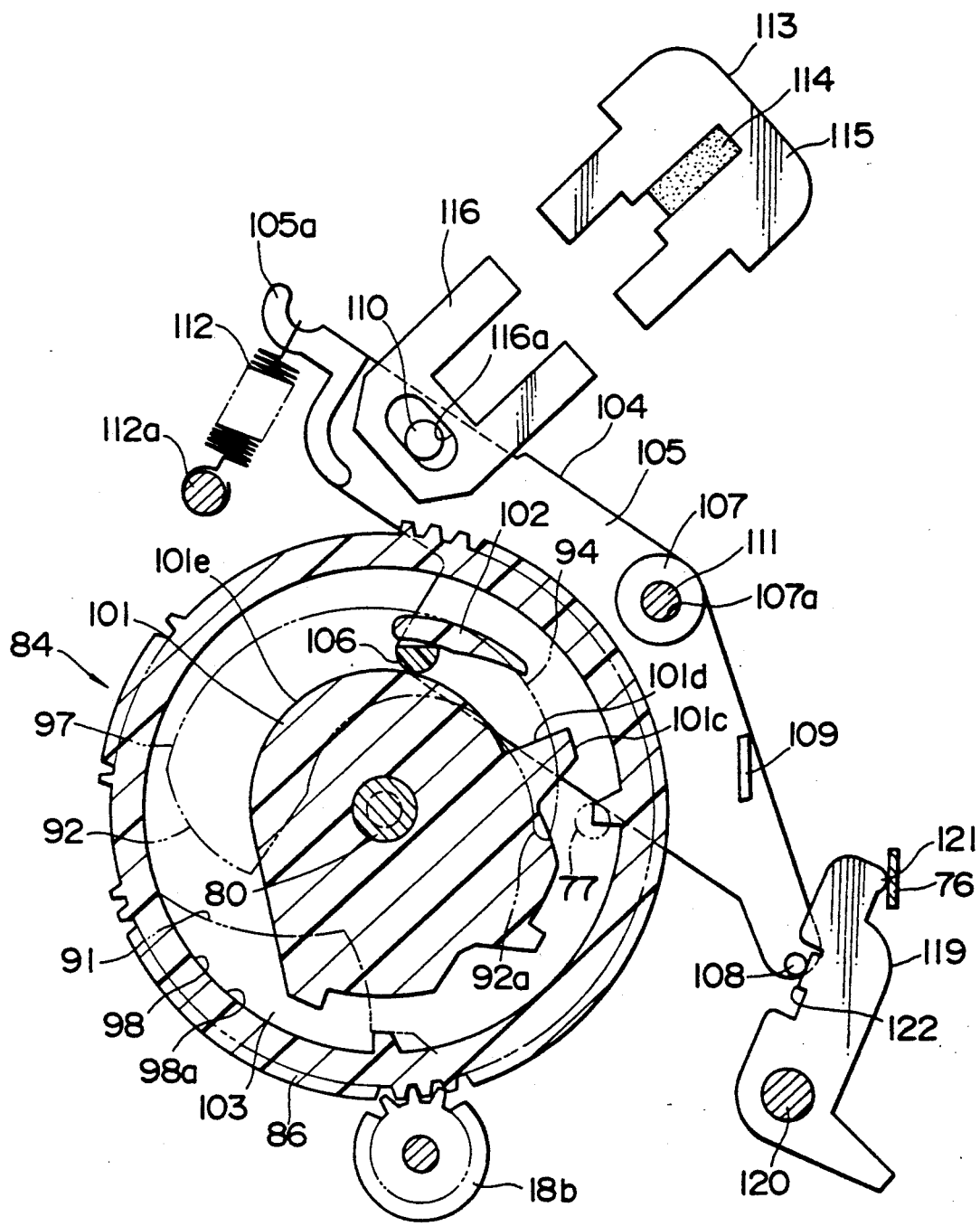
Figure 19C:
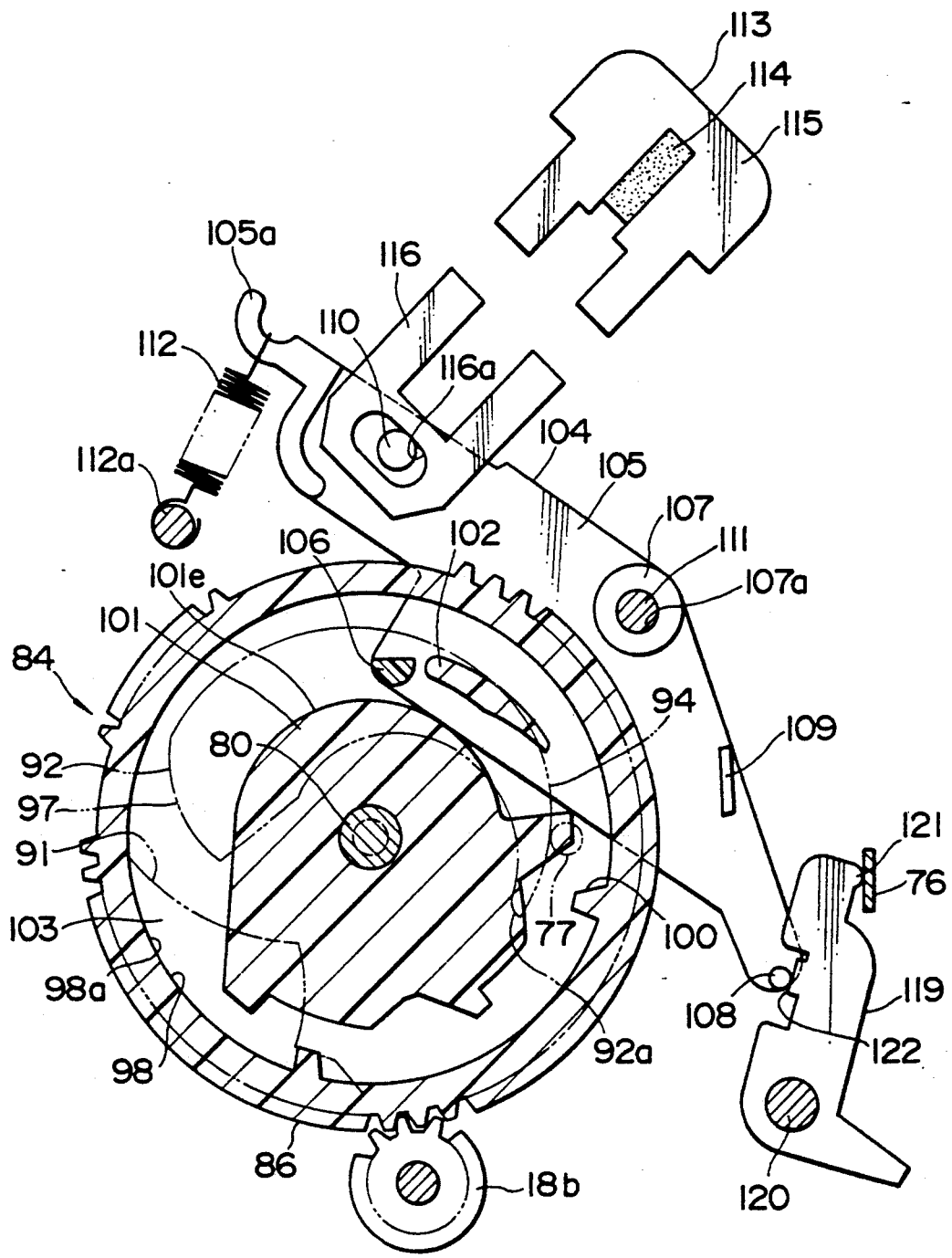
Figure 20B:
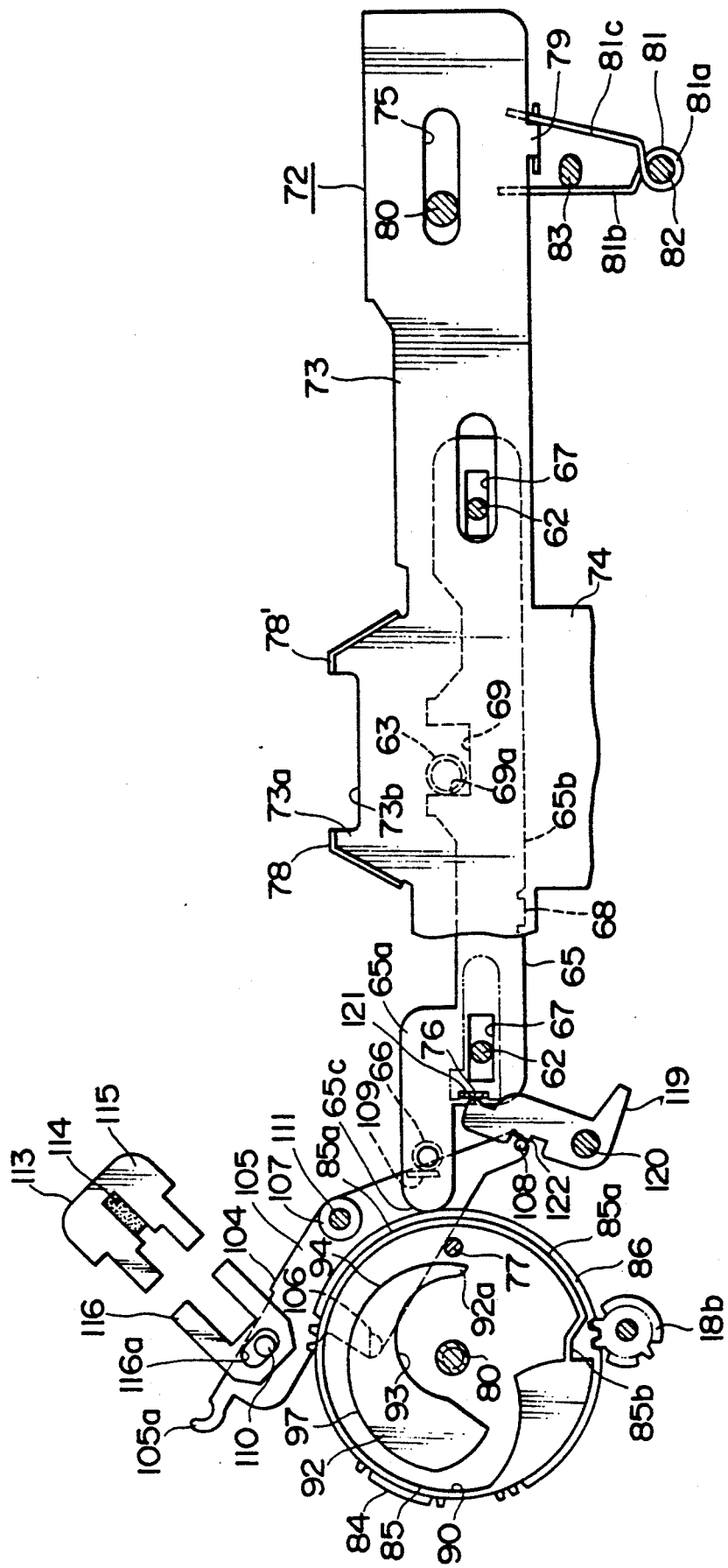

In particular, after energization of the solenoid plunger 113 is performed for the second time, the reverse mode pressing cam 102 of the cam gear 84 presses the engaging projection 106 of the trigger lever 104 substantially toward the front as shown in FIG. 19(B). Consequently, the trigger lever 104 is further pivoted in the counterclockwise direction from the non-arresting position so that the pressing pin 108 thereof presses the pressure receiving lug 76 of the direction slider 72 toward the right by way of the intermediate lever 119. As a result of such pressing operation, the direction slider 72 is moved to a location near the reverse mode position as shown in FIG. 20(B) so that the control pin 77 is moved rightwardly farther than the locus of the end portion 92a of the cam projection 92 upon rotation of the cam gear 84 until the end portion 92a of the cam projection 92 is positioned to the left-hand side of the control pin 77 as shown in FIGS. 19(B) and 20(B) while the reverse mode pressing cam 102 presses the engaging projection 106. Then, when the reverse mode pressing cam 102 is disengaged from the engaging projection 106 as shown in FIG. 19(C), the direction slider 72 is moved leftwardly to the stopping position by the biasing force of the centering spring 81 so that the control pin 77 thereof is resiliently contacted with the reverse mode pressing face 94 of the cam projection 92.

Accordingly, from the position, the reverse mode pressing face 94 presses the control pin 77 to move toward the right to move the direction slider 72 toward the reverse mode position.

The pressing operation of the reverse mode pressing face 94 of the cam gear 84 against the control pin 77 of the direction slider 72 to the left comes to an end when an end of the reverse mode pressing face 94 adjacent the second pressure receiving face 96 is contacted with the control pin 77, and thereupon, the direction slider 72 comes to a position displaced rightwardly a little from the reverse mode position. Meanwhile, at a point of time a little before then, the trigger lever 104 is returned to the arresting position since the engaging projection 106 thereof is pressed by the displacing face 101f of the second cam portion 103 of the cam gear 84. Immediately after an end of the reverse mode pressing face 94 adjacent the second pressure receiving face 96 of the cam gear 84 is contacted with the control pin 77 of the direction slider 72, the cam gear 84 reaches the second locked position so that the second locking projection 100 thereof is abutted with the engaging projection 106 of the trigger lever 104. Then, for such very short period of time, the control pin 77 is returned leftwardly a little because it is abutted with an end portion of the second pressure receiving face 96 of the cam projection 92 adjacent the reverse mode pressing face 94 as shown in FIG. 9 and as indicated by an alternate long and two short dashes line in FIG. 18, and consequently, the direction slider 72 comes to the reverse mode position.

Accordingly, when the cam gear 84 is at the second locked position, rotation of the cam gear 84 is inhibited while the control pin 77 is abutted from rightwardly with the second pressure receiving face 96 of the cam projection 92 which is directed substantially to the right rear so that it is prevented from moving leftwardly. Consequently, the direction slider 72 is held at the reverse mode position against the biasing force of the centering spring 81.

Thus, since the direction slider 72 is moved to the reverse mode position and thereafter held there, the seesaw lever 50 is pivoted in the clockwise direction to move the head base 24 to the playing position while the reverse mode side pinch roller lever 19' is moved to the advanced position so that the pinch roller 20' thereon is resiliently pressed against the reverse mode side capstan 9'. Meanwhile, the oscillating lever 56 for a low speed is pivoted in the counterclockwise direction so that the oscillating gear 57 for a low speed is brought into meshing engagement with the gear portion 7' of the supply side reel base 5'.

A reverse play mode is established in this manner.

Referring now to FIGS. 18 and 20, if an instruction signal to cancel a currently established play mode, or in other words, an instruction signal to select a stop mode or a high speed feeding mode is inputted from the operating section 125 to the system controller 124, energization of the solenoid plunger 113 is performed while the motor 10 is caused to rotate forwardly.

Consequently the trigger lever 104 is pivoted in the counterclockwise direction as indicated by an alternate long and two short dashes line in FIG. 18 so that locking of the cam gear 84 at the second locked position is cancelled. In this instance, since the holding face 101g of the second cam portion 103 of the cam gear 84 is opposed to the engaging projection 106 of the trigger lever 104, the trigger lever 104 which is released from attraction by the solenoid plunger 113 is stopped, at a position where the engaging projection 106 is abutted with the holding face 101g, from being further pivoted in the counterclockwise direction.

Figure 21A:
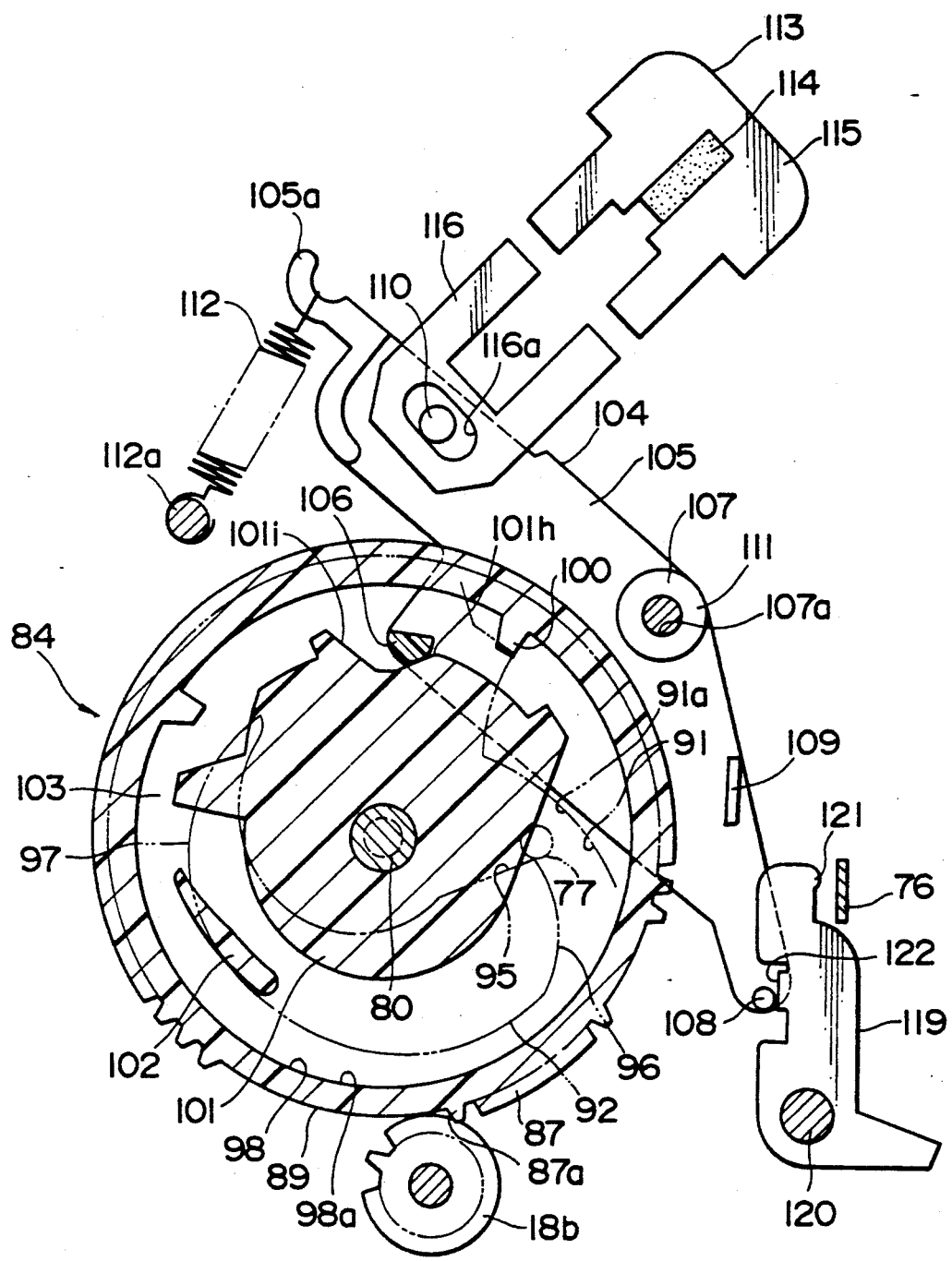
FIGS. 21(A), 21(B) and 21(C) are enlarged horizontal sectional views of the cam gear and trigger lever during establishment of a stop mode.
Figure 21B:
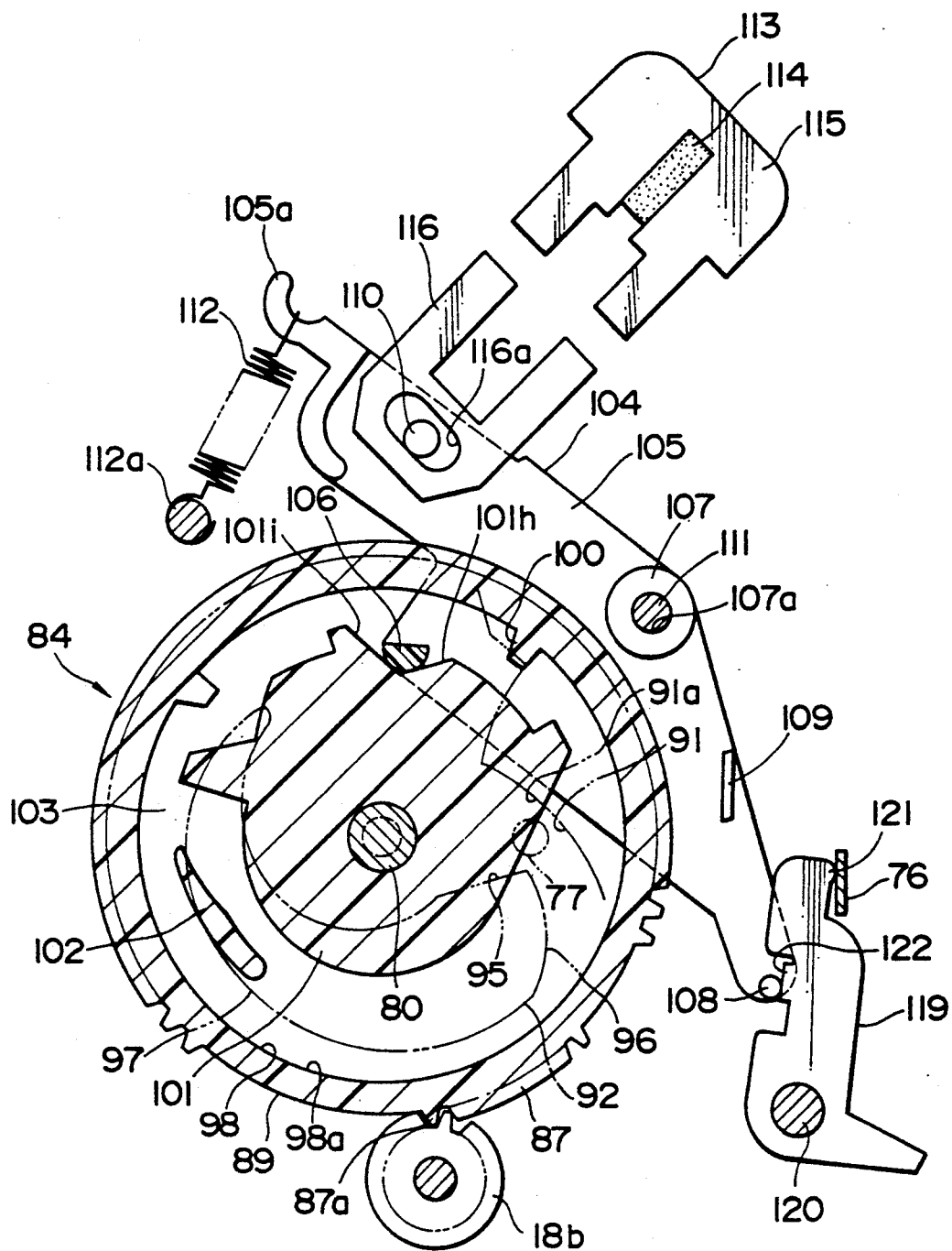
Figure 21C:
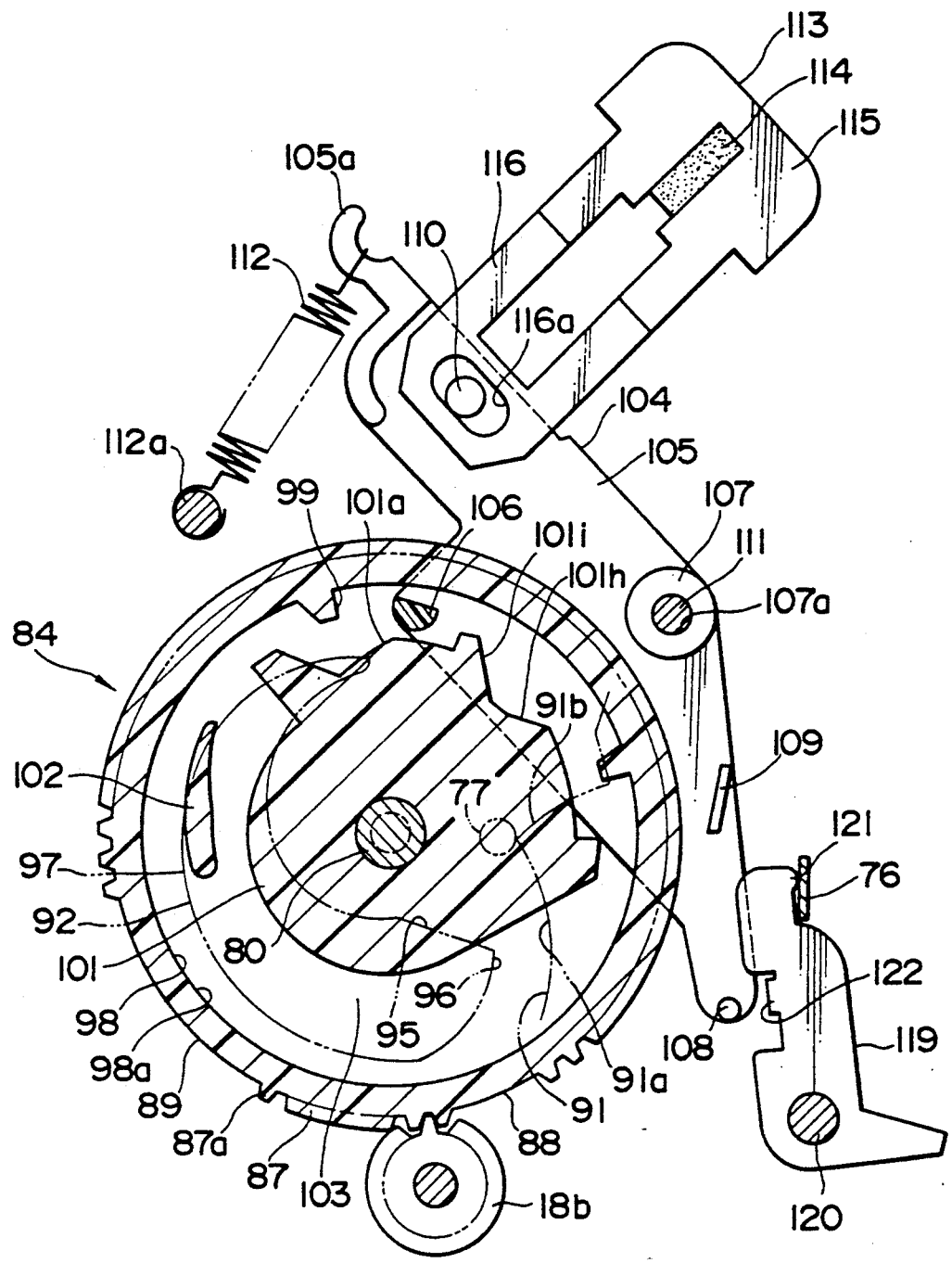
Figure 22:
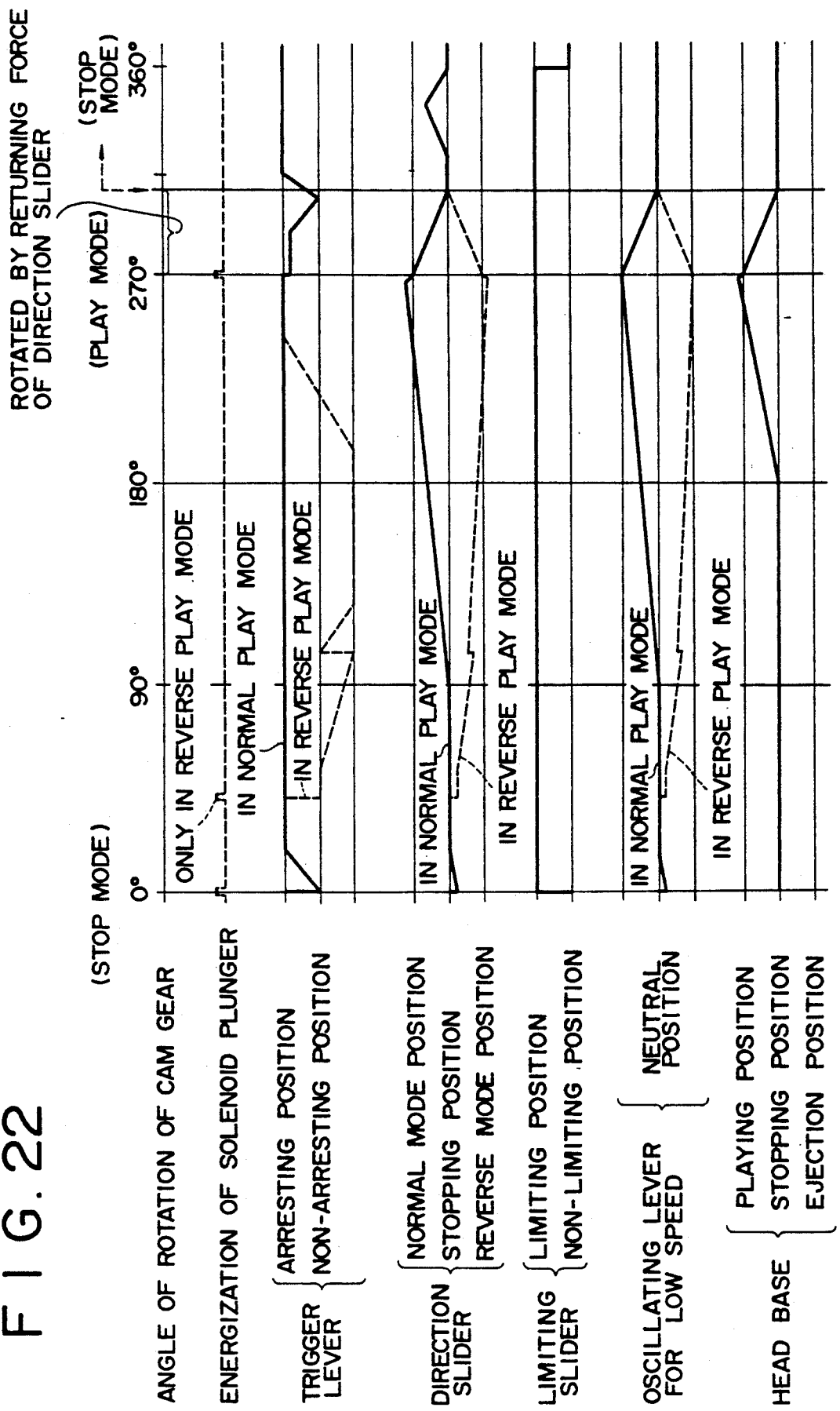
FIG. 22 is a time chart illustrating operation of the mode changing over mechanism involved in rotation of the cam gear.

Then, after locking of the cam gear 84 by the trigger lever 104 is cancelled, the cam gear 84 is rotated at a stroke to a position shown in FIG. 21(B) mainly by the returning force of the direction slider 72 to the stopping position so that the leading end portion 87a of the first toothed portion 87 thereof is brought into meshing engagement with the driving gear 18b.

In particular, as described hereinabove, when the tape player 1 is in a normal play mode, the direction slider 72 is held at the normal mode position against the returning force to the stopping position by the centering spring 81 because the control pin 77 thereof is abutted from leftwardly with the first pressure receiving face 95 of the cam gear 84, but when the tape player 1 is in a reverse play mode, the direction slider 72 is also held at the reverse mode position against the returning force to the stopping position because the control pin 77 thereof is abutted from rightwardly with the second pressure receiving face 96. Accordingly, in either of the two play modes, a turning force in the clockwise direction provided by the returning force to the stopping position acting upon the direction slider 72 is provided to the cam gear 84, but the cam gear 84 is prevented from rotating by the trigger lever 104 against such turning force. Further, when the tape player 1 is in a play mode, since the leading end of the second toothed portion 89 of the cam gear 84 in the clockwise direction is opposed to the driving gear 18b, while the cam gear 84 is rotated to some degree from the second locked position, the second toothed portion 87 of the cam gear 84 is not brought into meshing engagement with the driving gear 18b. Consequently, when locking of the cam gear 84 is cancelled while the tape player 1 is in a play mode, the cam gear 84 is rotated in the clockwise direction by the turning force provided by the returning force of the direction slider 72 to the stopping position, and such rotation continues until the control pin 77 is disengaged from the first pressure receiving face 95 or the second pressure receiving face 96 as shown in FIG. 21(A). Further, when the cam gear 84 comes to a position shown in FIG. 21(A), the engaging projection 106 of the trigger lever 104 is contacted with the last time pressure receiving face 101h of the second cam portion 103 to press the last time pressure receiving face 101h forwardly a little toward the right-hand side. Accordingly, from here, the cam gear 84 is further rotated in the clockwise direction by the turning force exerted by the tension spring 112 to the trigger lever 104. Such rotation continues until the engaging projection 106 is abutted with the ravine bottom-like portion at which the last time pressure receiving face 101h and the contiguous last time pushing back face 101i connect to each other as shown in FIG. 21(B), and consequently, the starting end portion 87a of the second toothed portion 87 is brought into meshing engagement with the driving gear 18b as shown in FIG. 21(B).

Thereupon, the cam gear 84 comes to a position substantially midway between the first locked position and the second locked position.

Meanwhile, the direction slider 72 comes to the stopping position at a point of time when the control pin 77 thereon is spaced away from the first pressure receiving face 95 or the second pressure receiving face 96. Consequently, the oscillating lever 56 for a low speed and the seesaw lever 50 are returned to the respective neutral positions while the pinch roller lever 19 or 19' is returned to the retracted position and the head base 24 is returned to the location at which the regulating pin 29 thereof is abutted with the arresting edge 48b of the control lever 45, that is, to the stopping position.

Accordingly, at this point of time, that is, when the cam gear 84 comes to the first locked position or the second locked position, a stop mode is established in fact.

Then, the cam gear 84 is further rotated to the first locked position since the second toothed portion 87 thereof is fed by the driving gear 18b. Meanwhile, substantially at the same time as starting of rotation by the driving gear 18b, the last time pushing back face 101i of the second cam portion 103 of the cam gear 84 presses the engaging projection 106 to return the trigger lever 104 to the arresting position, and immediately after then, the cam gear 84 comes to the first locked position so that the first locking projection 99 thereof is abutted with and locked by the engaging projection 106 of the trigger lever 104 while the driving gear 18b is opposed to the first toothed portion 88.

It is to be noted that, when the cam gear 84 is rotated by the driving gear 18b, the control pin 77 of the direction slider 72 is pressed leftwardly a little by the last time guide face 91a of the first cam section 97 and then abutted with the stopping regulating face 91b. Consequently, the direction slider 72 is temporarily moved leftwardly a little farther than the stopping position.

Formation of a stop mode is performed in such a manner as described above.

Referring to FIG. 14, when the voltage of the battery power source 127 drops to a predetermined level when the tape player 1 is in a play mode, an actual stop mode is automatically established and the head base 24 is returned to the stopping position.

In particular, as described hereinabove, if it is detected by the reduced voltage detecting circuit 128 that the voltage of the battery power source 127 is reduced to a value lower than a predetermined level, a limit signal is delivered from the reduced voltage detecting circuit 128 to the system controller 124. Consequently, energization of the solenoid plunger 113 is performed so that locking of the cam gear 84 at the second locked position is cancelled.

Consequently, the direction slider 72 is moved to the stopping position while rotating the cam gear 84 by the returning force to the stopping position provided by the centering spring 81 similarly as upon formation of a stop mode described hereinabove, and consequently, the seesaw lever 50 is returned to the neutral position so that the head base 24 is moved to the stopping position.

Thus, except that the cam gear 84 of the tape player 1 is stopped between the first locked position and the second locked position, an actual stop mode is reached, and since position control of the direction slider 72 and he head base 24 by the seesaw lever 50 is cancelled, it becomes possible to move the control lever 45 to the ejection position.

It is to be noted that, while in the embodiment described above a pivotal lever which is held at the arresting position when it is attracted to the solenoid plunger of the self holding type and is released, when the solenoid plunger is energized, form such attraction and is moved to the non-arresting position by the resilient member is used as the trigger member and returning of such trigger member from the non-arresting position to the arresting position is performed by part of the second cam section provided on the cam gear, since selection of the number of times by which the engaging portion of the trigger member is moved to the non-arresting position can be electrically processed by such construction, the mechanical construction can be further simplified as much.

However, the trigger member in the present invention need not necessarily be such trigger member in the form of a lever and may be nay member only if it is moved between the arresting position at which it inhibits rotation of the cam gear and the non-arresting position at which such inhibition is cancelled.

Further, while in the embodiment pressing of the direction slider by the trigger member is performed by way of the intermediate lever, the intermediate lever is provided in order to amplify a movement of the trigger member relative to the direction slider and does not make any essential element in the present invention.

Furthermore, shapes, structures and so forth of various members shown in the embodiment, particularly shapes and so forth of various cam portions are only indicated as mere examples of exemplification in putting the pressing invention into practice, and the technical scope of the present invention shall not be interpreted to be restricted by them.

What is claimed is:

1. A mode changing over mechanism for a tape player, comprising:
   a direction slider movable from and to a normal mode position in which a tape is fed in one direction, a reverse mode position in which a tape is fed in a direction opposite to the one direction, and a stopping position in which the tape player is inoperative, said direction slider having a control portion thereon;
   a trigger member having an engaging portion movable between an arresting position and a non-arresting position;
   release means for holding said engaging portion in said arresting position and for releasing said engaging portion from said arresting position to said non-arresting position;
   a rotatable cam gear having a first cam section associated with said control portion which includes a normal mode pressing face for pressing said control portion of said direction slider in one direction and a reverse ode pressing face for pressing said control portion in another direction, said cam gear further having a second cam section associated with said engaging portion, said cam gear being inhibited from rotating when said engaging portion of said trigger member is at the arresting position during a play mode and during a stop mode; and wherein said normal mode pressing face of said first cam section of said cam gear presses, when said engaging portion of said trigger member is moved to the non-arresting position by a first operation of said release means while the tape player is in a stop mode, said control portion of said direction slider to move said direction slider to the normal mode position and said cam gear causes said engaging portion to return to said arresting position, but when movement of said engaging portion of said trigger member to the non-arresting position is performed by a second operation of said release means, said reverse mode pressing face of said first cam section presses said control portion to move said direction slider to the reverse mode position.

2. A mode changing over mechanism according to claim 1, wherein, when movement of said engaging portion of said trigger member of the non-arresting position is performed by the second operation of said release means, said engaging portion of said trigger member is pressed by said second cam section so that said trigger member presses said direction slider in the other direction thereby to cause said reverse mode pressing face of said first cam section to press said control portion in order to move said direction slider to the reverse mode position.

3. A mode changing over mechanism according to claim 1, wherein said cam gear has a first locked position for a stop mode and a second locked position for a normal or reverse play mode and is moved from said first to said second locked position or from said second to said first locked position by movement of said engaging portion of said trigger member from said arresting position to said non-arresting position by said first or second operation of said release means.

4. A mode changing over mechanism according to claim 3, further comprising a drive gear engageable with said cam gear and wherein said cam gear has first and second non-toothed portions, respectively associated with said first and second locked positions, each of said non-toothed portions is respectively opposed to said drive gear when sad cam gear is in said first or second locked position.

5. A mode changing over mechanism according to claim 1, wherein said release means comprises one selectively activated electromagnetic element.

* * * * *

UNITED STATES PATENT AND TRADEMARK OFFICE
CERTIFICATE OF CORRECTION

PATENT NO. : 5,260,844
DATED : November 9, 1993
INVENTOR(S) : Noriyuki Koga and Takeyoshi Takashina It is certified that error appears in the above-indentified patent and that said Letters Patent is hereby corrected as shown below:

On the title page, item [75]
Under Inventors, change "Takeyoshi Takashima" to
     --Takeyoshi Takashina--
In the Abstract, line 20, change "nonarresting" to
     --non-arresting--
Col.2, line 68, change "nonarresting" to --non-arresting--
Col. 3, line 48, change "nontoothed" to --non-toothed--
Col. 5, line 37, change "left hand" to --left-hand--
Col. 6, line 47, after "respectively" insert --,--
Col. 22, line 63, change "a-position" to --a position--
     line 67, delete "also"
Col. 26, line 49, change "14" to --114--
Col. 27, line 11, change "o" to --on--
Col. 29, line 36, change "ht" to --the--
     line 56, after "at" insert --a--
Col. 31, line 41, change "norma" to --normal--
Col. 32, line 47, change "nonarresting" to --non-arresting--
Col. 36, line 8, change "he" to --the--
     line 15, change "form" to --from--
     line 28, change "nay" to --any--

UNITED STATES PATENT AND TRADEMARK OFFICE
CERTIFICATE OF CORRECTION

PATENT NO. : 5,260,844
DATED : November 9, 1993
INVENTOR(S) : Noriyuki Koga and Takeyoshi Takshina It is certified that error appears in the above-indentified patent and that said Letters Patent is hereby corrected as shown below:

<u>In the Claims:</u>

Col. 36, line 66, change "ode" to --mode--
Col. 37, line 12, after "gear" insert --is permitted to rotate, whereby rotation of said cam gear--
Col. 38, line 20, change "sad" to --said--

Signed and Sealed this

Sixth Day of June, 1995

BRUCE LEHMAN

*Attest:*

*Attesting Officer*                *Commissioner of Patents and Trademarks*